US012593205B2

(12) United States Patent
Zisimopoulos et al.

(10) Patent No.: US 12,593,205 B2
(45) Date of Patent: Mar. 31, 2026

(54) NETWORK SLICE-SPECIFIC AUTHENTICATION AND AUTHORIZATION

(71) Applicant: QUALCOMM INCORPORATED, San Diego, CA (US)

(72) Inventors: Haris Zisimopoulos, London (GB); Lenaig Genevieve Chaponniere, La Jolla, CA (US); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 18/004,153

(22) PCT Filed: Aug. 4, 2021

(86) PCT No.: PCT/US2021/044516
§ 371 (c)(1),
(2) Date: Jan. 3, 2023

(87) PCT Pub. No.: WO2022/035658
PCT Pub. Date: Feb. 17, 2022

(65) Prior Publication Data
US 2023/0336985 A1 Oct. 19, 2023

(30) Foreign Application Priority Data

Aug. 12, 2020 (GR) .............................. 20200100477

(51) Int. Cl.
*H04W 12/06* (2021.01)
*H04W 40/02* (2009.01)
(52) U.S. Cl.
CPC ........... *H04W 12/06* (2013.01); *H04W 40/02* (2013.01)

(58) Field of Classification Search
CPC ...... H04W 12/06; H04W 40/02; H04W 48/18
See application file for complete search history.

(56) References Cited

U.S. PATENT DOCUMENTS

| | | | |
|---|---|---|---|
| 2020/0053083 A1* | 2/2020 | Kunz | H04W 12/72 |
| 2020/0162919 A1* | 5/2020 | Velev | H04W 60/00 |

(Continued)

FOREIGN PATENT DOCUMENTS

| | | |
|---|---|---|
| CN | 111031571 A | 4/2020 |
| WO | WO-2019229492 A1 | 12/2019 |

OTHER PUBLICATIONS

International Search Report and Written Opinion—PCT/US2021/044516—ISA/EPO—Nov. 5, 2021.

(Continued)

*Primary Examiner* — Patrice L Winder
(74) *Attorney, Agent, or Firm* — Holland & Hart LLP

(57) ABSTRACT

Methods, systems, and devices for wireless communications are described. A communication device, otherwise known as a user equipment (UE) may configure an indication associated with network slice information. The UE may determine, based on the indication, that the network slice information is subject to network slice-specific authentication and authorization (NSSAA). Additionally or alternatively, the UE may determine an authentication credential associated with network slice information, and transmit, to an access and mobility management function (AMF), an indication related to an availability of an authentication credential associated with the network slice information. The UE may access a network slice associated with the network slice information based on the NSSAA of the network slice information.

30 Claims, 21 Drawing Sheets

(56) References Cited

U.S. PATENT DOCUMENTS

| | | | | |
|---|---|---|---|---|
| 2021/0400572 A1* | 12/2021 | Caceres | ............. | H04W 12/069 |
| 2023/0217241 A1* | 7/2023 | Velev | ..................... | H04W 8/20 |
| | | | | 455/414.1 |
| 2023/0276352 A1* | 8/2023 | Wang | ................. | H04L 41/5041 |
| | | | | 455/434 |

OTHER PUBLICATIONS

Ni J., et al., "Efficient and Secure Service-Oriented Authentication Supporting Network Slicing for 5G-Enabled IoT," IEEE Journal on Selected Areas in Communications, [Online] vol. 36, No. 3, May 16, 2018 (May 16, 2018), pp. 644-657, XP055841647, US ISSN: 0733-8716, DOI: 10.1109/JSAC.2018.2815418, the whole document.

Ericsson: "5G System Details for PCC", SA WG2 Meeting #122, S2-174210 (Revision of S2-17XXXX), Jun. 26, 2017-Jun. 30, 2017, San Jose Del Cabo, pp. 1-272, Jun. 20, 2017.

* cited by examiner

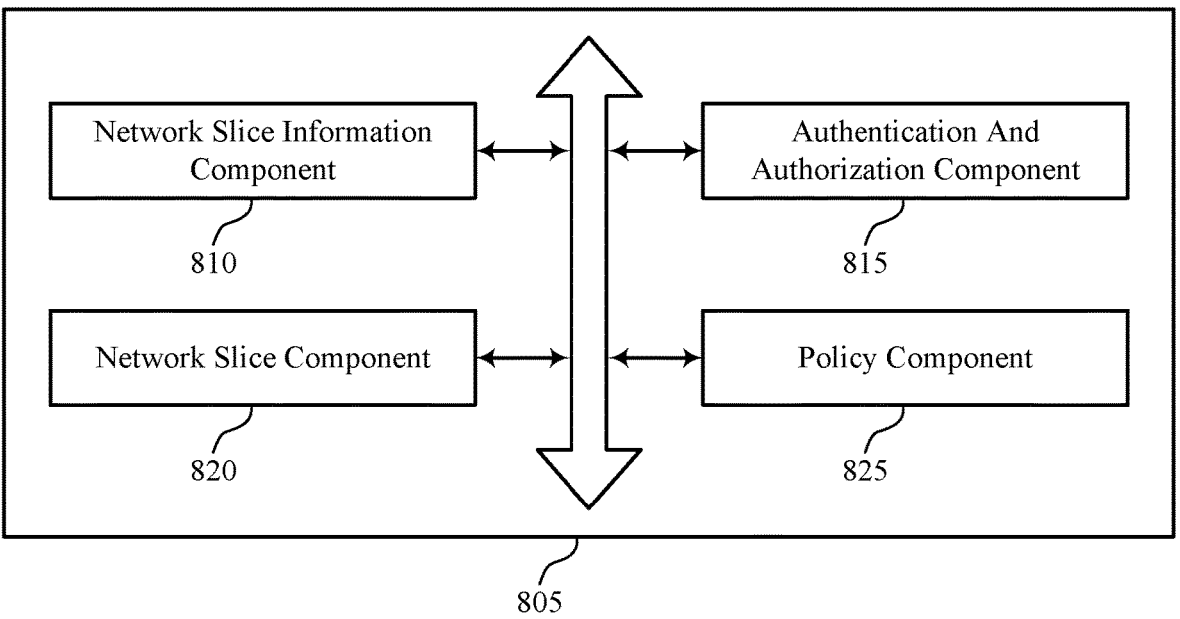
805
800
FIG. 8

1010

1015

1020

1005

1000

Configure an indication associated with network slice information

1405

Determine, based on the indication, that the network slice information is subject to NSSAA

1410

Access a network slice associated with the network slice information based on the NSSAA of the network slice information

1415

1400

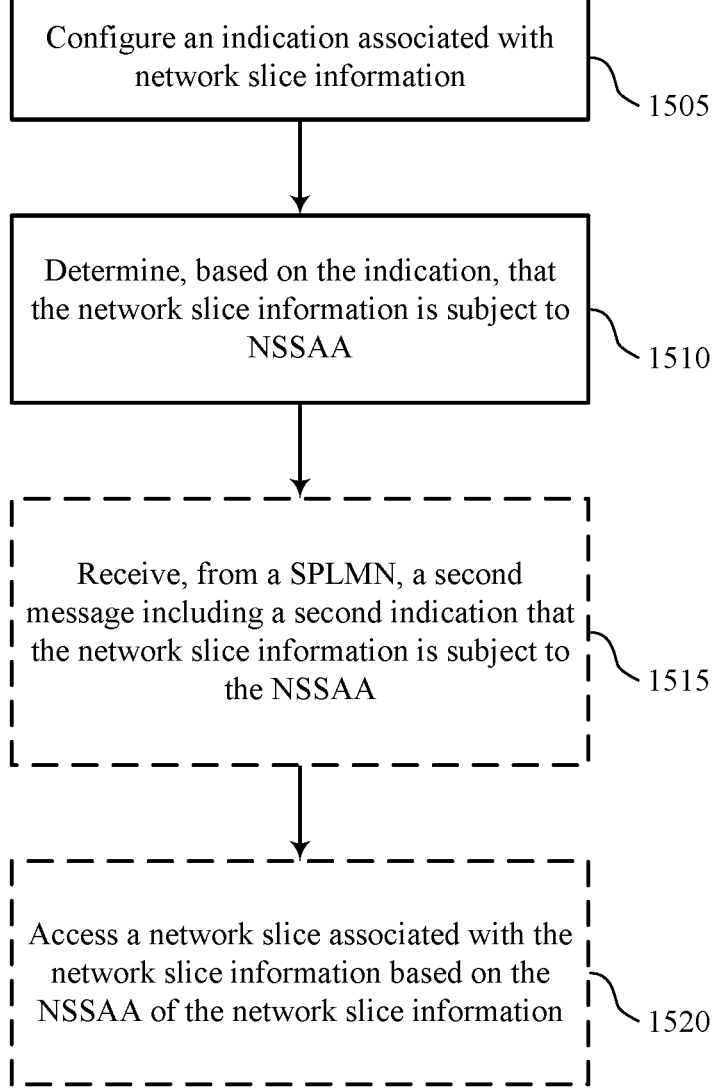

Configure an indication associated with network slice information ⌇1505

Determine, based on the indication, that the network slice information is subject to NSSAA ⌇1510

Receive, from a SPLMN, a second message including a second indication that the network slice information is subject to the NSSAA ⌇1515

Access a network slice associated with the network slice information based on the NSSAA of the network slice information ⌇1520

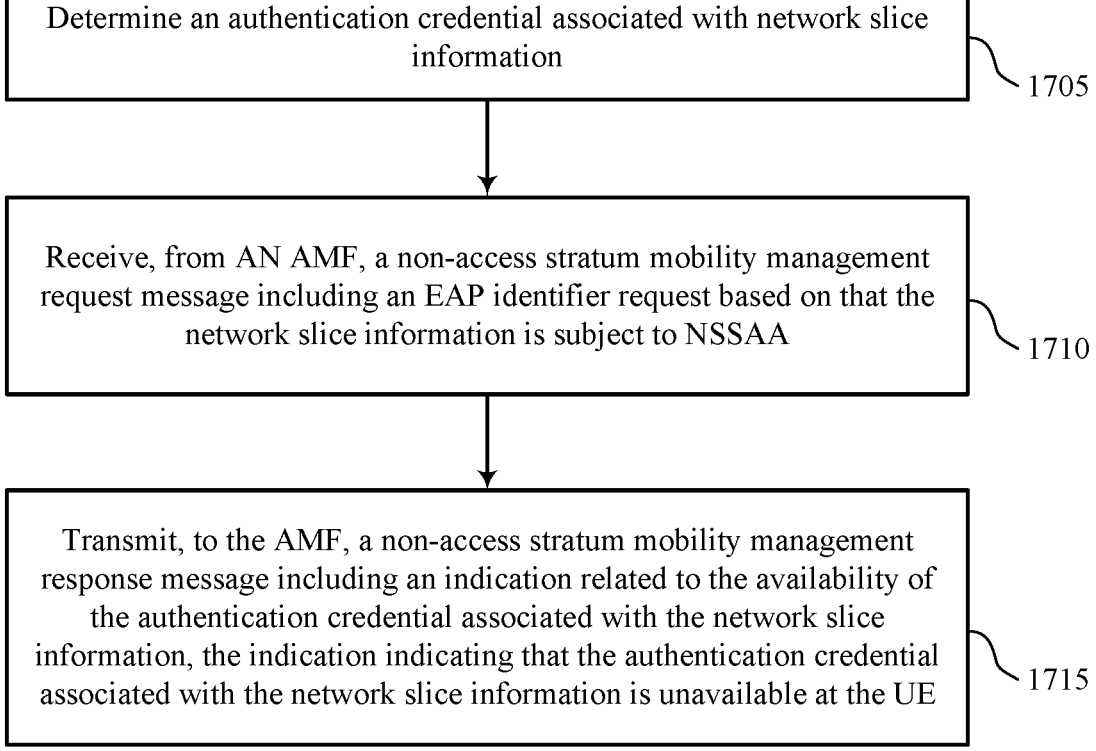

Determine an authentication credential associated with network slice information

1705

Receive, from AN AMF, a non-access stratum mobility management request message including an EAP identifier request based on that the network slice information is subject to NSSAA

1710

Transmit, to the AMF, a non-access stratum mobility management response message including an indication related to the availability of the authentication credential associated with the network slice information, the indication indicating that the authentication credential associated with the network slice information is unavailable at the UE

Receive a first indication related to an availability of an authentication credential associated with network slice information

⌐ 1805

Determine, based on the first indication, that the network slice information is subject to NSSAA

⌐ 1810

Provision the authentication credential associated with the network slice information for a UE based on the determining

⌐ 1815

1800

Transmit, to a UE, a non-access stratum mobility management request message including an EAP identifier based on that network slice information is subject to NSSAA

1905

Receive, from the UE, a non-access stratum mobility management response message including an indication related to an availability of an authentication credential associated with the network slice information, the indication indicating that the authentication credential associated with the network slice information is unavailable at the UE

1910

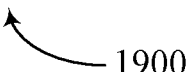

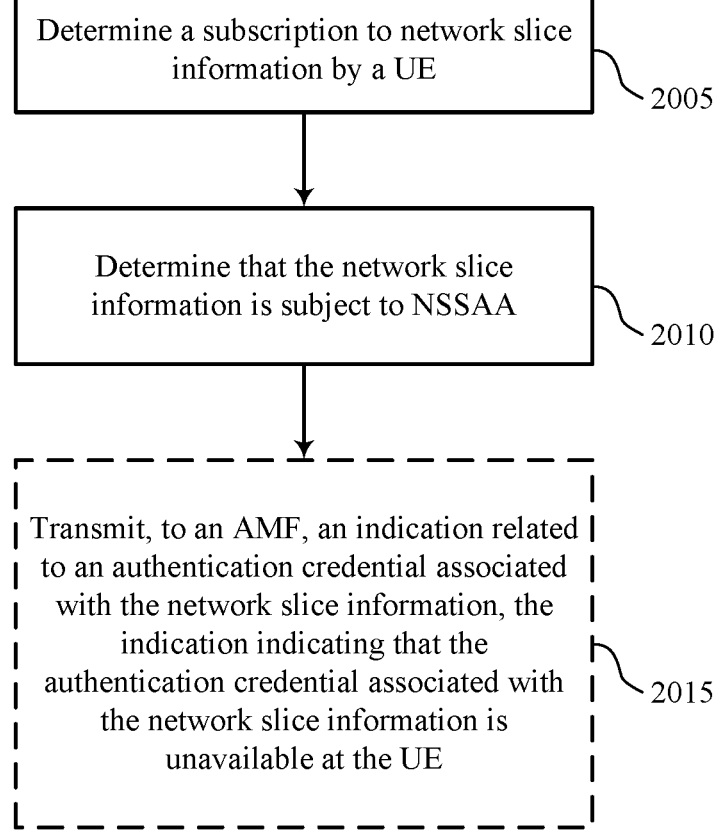

Determine a subscription to network slice information by a UE 2005

Determine that the network slice information is subject to NSSAA 2010

Transmit, to an AMF, an indication related to an authentication credential associated with the network slice information, the indication indicating that the authentication credential associated with the network slice information is unavailable at the UE 2015

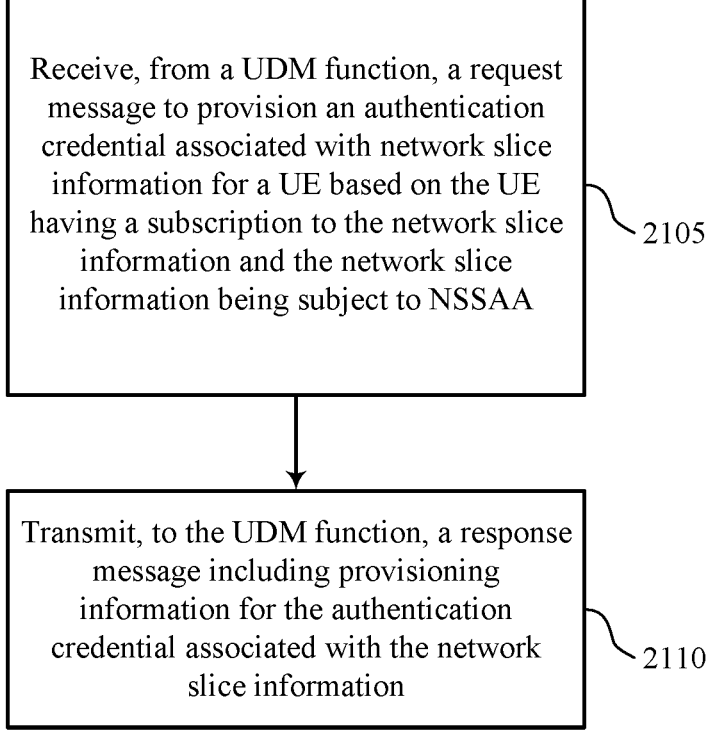

Receive, from a UDM function, a request message to provision an authentication credential associated with network slice information for a UE based on the UE having a subscription to the network slice information and the network slice information being subject to NSSAA

2105

Transmit, to the UDM function, a response message including provisioning information for the authentication credential associated with the network slice information

NETWORK SLICE-SPECIFIC
AUTHENTICATION AND AUTHORIZATION

CROSS REFERENCE

The present Application is a 371 national stage filing of International PCT Application No. PCT/US2021/044516 by ZISIMOPOULOS et al. entitled "NETWORK SLICE-SPE-CIFIC AUTHENTICATION AND AUTHORIZATION," filed Aug. 4, 2021; and claims priority to Greek Patent Application No. 20200100477 by ZISIMOPOULOS et al. entitled "NETWORK SLICE-SPECIFIC AUTHENTICA-TION AND AUTHORIZATION," filed Aug. 12, 2020, each of which is assigned to the assignee hereof, and each of which is expressly incorporated by reference in its entirety herein.

INTRODUCTION

The following relates to wireless communications in wireless communications systems, and more specifically to techniques for managing authentication and authorization of network slices in the wireless communications systems.

Some wireless communications systems are widely deployed to provide various types of communication content such as voice, video, packet data, messaging, broadcast, and so on. These systems may be capable of supporting com-munication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless communications system may include one or more base stations or one or more network access nodes, each simultaneously supporting com-munication for multiple communication devices, which may be otherwise known as user equipment (UE).

SUMMARY

A method of wireless communication at a UE is described. The method may include configuring an indica-tion associated with network slice information, and deter-mining, based on the indication, that the network slice information is subject to network slice-specific authentica-tion and authorization (NSSAA). The method may further include accessing a network slice associated with the net-work slice information based on the NSSAA of the network slice information.

An apparatus for wireless communication is described. The apparatus may include a processor, memory coupled to the processor, the processor and memory configured to configure an indication associated with network slice infor-mation, determine, based on the indication, that the network slice information is subject to NSSAA, and access a network slice associated with the network slice information based on the NSSAA of the network slice information.

Another apparatus for wireless communication is described. The apparatus may include means for configuring an indication associated with network slice information, determining, based on the indication, that the network slice information is subject to NSSAA, and accessing a network slice associated with the network slice information based on the NSSAA of the network slice information.

A non-transitory computer-readable medium storing code for wireless communication at a UE is described. The code may include instructions executable by a processor to con-figure an indication associated with network slice informa-tion, determine, based on the indication, that the network slice information is subject to NSSAA, and access a network slice associated with the network slice information based on the NSSAA of the network slice information.

Some examples of the method, apparatuses, and non-transitory computer-readable medium described herein may further include operations, features, means, or instructions for determining UE route selection policy. In some examples of the method, apparatuses, and non-transitory computer-readable medium described herein, determining that the network slice information may be subject to the NSSAA may be based on the UE route selection policy.

In some examples of the method, apparatuses, and non-transitory computer-readable medium described herein, the UE route selection policy includes the indication that the network slice information may be subject to NSSAA.

Some examples of the method, apparatuses, and non-transitory computer-readable medium described herein may further include operations, features, means, or instructions for receiving, from a single public land mobile network (SPLMN), a second message including a second indication that the network slice information may be subject to the NSSAA.

A method of wireless communication at a UE is described. The method may include determining an authen-tication credential associated with network slice informa-tion, transmitting, to an access and mobility management function (AMF), a first indication related to an availability of an authentication credential associated with the network slice information, and accessing, in response to NSSAA of the network slice information, a network slice associated with the network slice information based on the transmitted first indication related to the availability of the authentica-tion credential associated with the network slice informa-tion.

An apparatus for wireless communication is described. The apparatus may include a processor, memory coupled to the processor, the processor and memory configured to determine an authentication credential associated with net-work slice information, transmit, to an AMF, a first indica-tion related to an availability of an authentication credential associated with the network slice information, and access, in response to NSSAA of the network slice information, a network slice associated with the network slice information based on the transmitted first indication related to the availability of the authentication credential associated with the network slice information.

Another apparatus for wireless communication is described. The apparatus may include means for determin-ing an authentication credential associated with network slice information, transmitting, to an AMF, a first indication related to an availability of an authentication credential associated with the network slice information, and access-ing, in response to NSSAA of the network slice information, a network slice associated with the network slice informa-tion based on the transmitted first indication related to the availability of the authentication credential associated with the network slice information.

A non-transitory computer-readable medium storing code for wireless communication at a UE is described. The code may include instructions executable by a processor to determine an authentication credential associated with network slice information, transmit, to an AMF, a first indication related to an availability of an authentication credential associated with the network slice information, and access, in response to NSSAA of the network slice information, a network slice associated with the network slice information based on the transmitted first indication related to the availability of the authentication credential associated with the network slice information.

In some examples of the method, apparatuses, and non-transitory computer-readable medium described herein, the first indication indicates that the authentication credential associated with the network slice information may be available or unavailable at the UE.

Some examples of the method, apparatuses, and non-transitory computer-readable medium described herein may further include operations, features, means, or instructions for transmitting, to the AMF, a first registration request message including the first indication related to the availability of the authentication credential associated with the network slice information, the first indication indicating that the authentication credential may be unavailable at the UE. In some examples of the method, apparatuses, and non-transitory computer-readable medium described herein, the registration request message further includes NSSAA capability information.

Some examples of the method, apparatuses, and non-transitory computer-readable medium described herein may further include operations, features, means, or instructions for receiving, from the AMF, a registration response message associating the network slice information to a list of pending network slice information.

Some examples of the method, apparatuses, and non-transitory computer-readable medium described herein may further include operations, features, means, or instructions for receiving, from a NSSAA function, the authentication credential associated with the network slice information in a user-plane associated with the UE based on the transmitted first indication indicating that the authentication credential may be unavailable at the UE, and transmitting, to the AMF, a second registration request message including a second indication related to the availability of the authentication credential associated with the network slice information. In some examples of the method, apparatuses, and non-transitory computer-readable medium described herein, the second indication indicating that the authentication credential may be available at the UE.

Some examples of the method, apparatuses, and non-transitory computer-readable medium described herein may further include operations, features, means, or instructions for receiving, from a user data management function (UDM), the authentication credential associated with the network slice information in a control-plane associated with the UE based on transmitting, to the AMF, the first indication related to the availability of the authentication credential associated with the network slice information, and transmitting, to the AMF, a second registration request message including a second indication related to the availability of the authentication credential associated with the network slice information. In some examples of the method, apparatuses, and non-transitory computer-readable medium described herein, the second indication indicating that the authentication credential may be available at the UE.

Some examples of the method, apparatuses, and non-transitory computer-readable medium described herein may further include operations, features, means, or instructions for receiving, from the AMF, a non-access stratum mobility management request message including an extensible authentication protocol (EAP) identifier request based on that the network slice information may be subject to NSSAA, and transmitting, to the AMF, a non-access stratum mobility management response message including a second indication related to the availability of the authentication credential associated with the network slice information. In some examples of the method, apparatuses, and non-transitory computer-readable medium described herein, the second indication indicating that the authentication credential associated with the network slice information may be unavailable at the UE.

A method of wireless communication at an AMF is described. The method may include receiving a first indication related to an availability of an authentication credential associated with network slice information, and determining, based on the first indication, that the network slice information is subject to NSSAA. The method may further include provisioning the authentication credential associated with the network slice information for a UE based on the determining.

An apparatus for wireless communication is described. The apparatus may include a processor, memory coupled to the processor, the processor and memory configured to receive a first indication related to an availability of an authentication credential associated with network slice information, determine, based on the first indication, that the network slice information is subject to NSSAA, and provision the authentication credential associated with the network slice information for a UE based on the determining.

Another apparatus for wireless communication is described. The apparatus may include means for receiving a first indication related to an availability of an authentication credential associated with network slice information, determining, based on the first indication, that the network slice information is subject to NSSAA, and provisioning the authentication credential associated with the network slice information for a UE based on the determining.

A non-transitory computer-readable medium storing code for wireless communication at an AMF is described. The code may include instructions executable by a processor to receive a first indication related to an availability of an authentication credential associated with network slice information, determine, based on the first indication, that the network slice information is subject to NSSAA, and provision the authentication credential associated with the network slice information for a UE based on the determining.

In some examples of the method, apparatuses, and non-transitory computer-readable medium described herein, the first indication indicates that the authentication credential associated with the network slice information may be available or unavailable at the UE.

Some examples of the method, apparatuses, and non-transitory computer-readable medium described herein may further include operations, features, means, or instructions for receiving, from the UE, a first registration request message including the first indication related to the availability of the authentication credential associated with the network slice information. In some examples of the method, apparatuses, and non-transitory computer-readable medium described herein, the first registration request message further includes NSSAA capability information.

Some examples of the method, apparatuses, and non-transitory computer-readable medium described herein may further include operations, features, means, or instructions for storing the network slice information in a list of pending network slice information.

Some examples of the method, apparatuses, and non-transitory computer-readable medium described herein may further include operations, features, means, or instructions for transmitting, to the UE, a registration response message associating the network slice information to a list of pending network slice information based on the received first registration request message.

Some examples of the method, apparatuses, and non-transitory computer-readable medium described herein may further include operations, features, means, or instructions for refraining from triggering an EAP for the network slice information based on that the network slice information may be subject to NSSAA.

Some examples of the method, apparatuses, and non-transitory computer-readable medium described herein may further include operations, features, means, or instructions for receiving, from the UE, a second indication related to the availability of the authentication credential associated with the network slice information. In some examples of the method, apparatuses, and non-transitory computer-readable medium described herein, the second indication indicating that the authentication credential associated with the network slice information may be available at the UE.

Some examples of the method, apparatuses, and non-transitory computer-readable medium described herein may further include operations, features, means, or instructions for receiving, from the UE, a second registration request message including the second indication related to the availability of the authentication credential associated with the network slice information. In some examples of the method, apparatuses, and non-transitory computer-readable medium described herein, the second indication indicating that the authentication credential associated with the network slice information may be available at the UE.

Some examples of the method, apparatuses, and non-transitory computer-readable medium described herein may further include operations, features, means, or instructions for transmitting, to the UE, a non-access stratum mobility management request message including an EAP identifier based on that the network slice information may be subject to NSSAA, and receiving, from the UE, a non-access stratum mobility management response message including a second indication related to the availability of the authentication credential associated with the network slice information. In some examples of the method, apparatuses, and non-transitory computer-readable medium described herein, the second indication indicating that the authentication credential associated with the network slice information may be unavailable at the UE.

Some examples of the method, apparatuses, and non-transitory computer-readable medium described herein may further include operations, features, means, or instructions for transmitting, to a UDM, a service request message to trigger the provisioning of the authentication credential associated with the network slice information for the UE. In some examples of the method, apparatuses, and non-transitory computer-readable medium described herein, the service request message may include a second indication indicating that the authentication credential associated with the network slice information may be unavailable at the UE.

Some examples of the method, apparatuses, and non-transitory computer-readable medium described herein may further include operations, features, means, or instructions for receiving, from a UDM, the first indication related to the availability of the authentication credential associated with the network slice information, the first indication indicating that the authentication credential associated with the network slice information may be unavailable at the UE, and refraining from triggering an EAP for the network slice information based on that the network slice information may be subject to NSSAA.

Some examples of the method, apparatuses, and non-transitory computer-readable medium described herein may further include operations, features, means, or instructions for enabling a timer associated with the network slice information, and transmitting, to the UE, an EAP identifier associated with the network slice information based on the timer lapsing and the UE missing the authentication credential associated with the network slice information.

A method of wireless communication at a UDM is described. The method may include determining a subscription to network slice information by a UE and determining that the network slice information is subject to NSSAA. The method may further include transmitting, to an AMF, an indication related to an authentication credential associated with the network slice information, the indication indicating that the authentication credential associated with the network slice information is unavailable at the UE.

An apparatus for wireless communication is described. The apparatus may include a processor, memory coupled to the processor, the processor and memory configured to determine a subscription to network slice information by a UE, determine that the network slice information is subject to NSSAA, and transmit, to an AMF, an indication related to an authentication credential associated with the network slice information, the indication indicating that the authentication credential associated with the network slice information is unavailable at the UE.

Another apparatus for wireless communication is described. The apparatus may include means for determining a subscription to network slice information by a UE, determining that the network slice information is subject to NSSAA, and transmitting, to an AMF, an indication related to an authentication credential associated with the network slice information, the indication indicating that the authentication credential associated with the network slice information is unavailable at the UE.

A non-transitory computer-readable medium storing code for wireless communication at a UDM is described. The code may include instructions executable by a processor to determine a subscription to network slice information by a UE, determine that the network slice information is subject to NSSAA, and transmit, to an AMF, an indication related to the authentication credential associated with the network slice information, the indication indicating that the authentication credential associated with the network slice information is unavailable at the UE.

Some examples of the method, apparatuses, and non-transitory computer-readable medium described herein may further include operations, features, means, or instructions for performing a UE parameter update procedure to provision the authentication credential associated with the network slice information based on transmitting, to the AMF, the indication related to the authentication credential associated with the network slice information.

Some examples of the method, apparatuses, and non-transitory computer-readable medium described herein may further include operations, features, means, or instructions for provisioning the authentication credential associated with the network slice information for a control plane associated with the UE.

Some examples of the method, apparatuses, and non-transitory computer-readable medium described herein may further include operations, features, means, or instructions for receiving, from the AMF, a signaling message to trigger provisioning of the authentication credential associated with the network slice information for the UE.

A method of wireless communication at a provisioning server (PS) is described. The method may include receiving, from a UDM, a request message to provision an authentication credential associated with network slice information for a UE based on the UE having a subscription to the network slice information and the network slice information being subject to NSSAA. The method may further include transmitting, to the UDM, a response message including provisioning information for the authentication credential associated with the network slice information.

An apparatus for wireless communication is described. The apparatus may include a processor, memory coupled to the processor, the processor and memory configured to receive, from a UDM, a request message to provision an authentication credential associated with network slice information for a UE based on the UE having a subscription to the network slice information and the network slice information being subject to NSSAA and transmit, to the UDM, a response message including provisioning information for the authentication credential associated with the network slice information.

Another apparatus for wireless communication is described. The apparatus may include means for receiving, from a UDM, a request message to provision an authentication credential associated with network slice information for a UE based on the UE having a subscription to the network slice information and the network slice information being subject to NSSAA and transmitting, to the UDM, a response message including provisioning information for the authentication credential associated with the network slice information.

A non-transitory computer-readable medium storing code for wireless communication at a provisioning server is described. The code may include instructions executable by a processor to receive, from a UDM, a request message to provision an authentication credential associated with network slice information for a UE based on the UE having a subscription to the network slice information and the network slice information being subject to NSSAA and transmit, to the UDM, a response message including provisioning information for the authentication credential associated with the network slice information.

BRIEF DESCRIPTION OF THE DRAWINGS

FIG. 8 shows a block diagram of a communications manager that supports NSSAA in accordance with one or more aspects of the present disclosure.

FIGS. 14 through 21 show flowcharts illustrating methods that support NSSAA in accordance with one or more aspects of the present disclosure.

DETAILED DESCRIPTION

Figure 1:
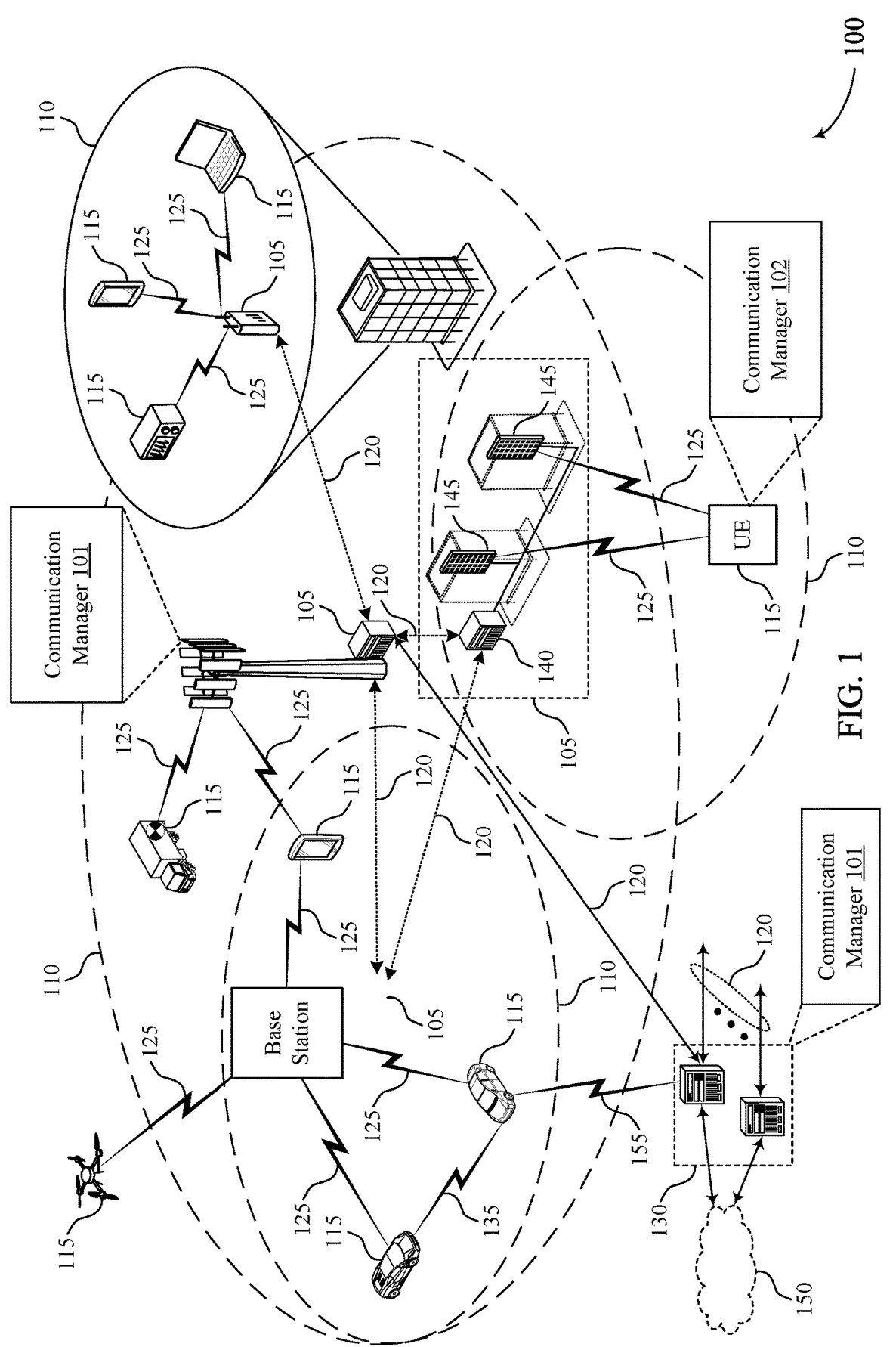
FIGS. 1 and 2 illustrate examples of wireless communications system that support NSSAA in accordance with one or more aspects of the present disclosure.

A wireless communications system may include communication devices, such as a UE and a base station (e.g., an eNodeB (eNB), a next-generation NodeB or a giga-NodeB, either of which may be referred to as a gNB, or some other base station), that support wireless communications over one or multiple radio access technologies. Examples of radio access technologies include 4G systems, such as LTE systems, and 5G systems, which may be referred to as NR systems. The wireless communications system may support one or multiple network slices over these one or multiple radio access technologies. Each network slice may provide specific network capabilities and network characteristics. For example, a network slice may include dedicated or shared resources of a wireless communications system in terms of processing power, storage, and bandwidth for a service or application. A network slice may also span across multiple network devices, for example, a base station, a network function of a core network, etc. A network function may be a logical node, which may be implemented in hardware, code (e.g., software or firmware) executed by a processor, or any combination thereof, to support network slices in the wireless communications system.

A UE may support various types of services and applications using one or multiple network slices. A UE may request, from a network device (e.g., a network function), a network slice for a service or application. As part of the request, the UE may provide credentials for authentication and authorization of the network slice. In some cases, however, the UE might not possess credentials for the authentication and authorization of the network slice, but may still provide the request to the network device (e.g., a network function). The network device may perform several operations as part of a network slice provisioning procedure to provision the UE with the requested network slice, before determining that the UE does not have credentials for the requested network slice. Because the UE does not possess the credentials for the requested network slice, the network slice provisioning procedure ultimately fails. As a result, the UE might end in a deregistered state.

To improve network slice authentication and authorization, the UE may be configured to inform a network device (e.g., a network function) that a network slice requires authentication and authorization prior to the UE requesting it. The UE may also be configured to inform the network device that it does not have credentials for the network slice. By informing the network device that the UE does not have credentials for the network slice, the network device may provision the UE with the credentials and avoid the UE resulting in a deregistered state. Alternatively, the network device may be informed by another network device (e.g., another network function) that the UE does not have the credentials for the network slice based on subscription information from the UE. Similarly, the network device may obtain the credentials from the other network device, and may provision the UE with the credentials and thereby avoid the UE from resulting in the deregistered state.

Aspects of the subject matter described in this disclosure may be implanted to realize one or more of the following potential advantages. The techniques employed by a UE may provide benefits and enhancements to the operation of the UE. For example, operations performed by the UE may provide improvements to network slice authentication and authorization operations. In some examples, the UE may support power saving, among other examples, by reducing a latency and increasing a reliability associated with the network slice authentication and authorization based on informing that the UE does or does not have credentials for a particular network slice. The UE may also include features for improvements to power consumption, spectral efficiency, higher data rates and, in some examples, may promote enhanced efficiency for high reliability and low latency network slice operations, among other benefits.

Aspects of the disclosure are initially described in the context of wireless communications systems. Aspects of the disclosure are then described with reference to NSSAA and process flow related to techniques for managing authentication and authorization of network slices. Aspects of the disclosure are further illustrated by and described with reference to apparatus diagrams, system diagrams, and flowcharts that relate to techniques for managing authentication and authorization of network slices.

FIG. 1 illustrates an example of a wireless communications system 100 that supports NSSAA in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and Aff may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies. The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission communications. The UEs 115 may be designed to support ultra-reliable, low-latency, or critical functions (e.g., mission functions). Ultra-reliable communications may include private communication or group communication and may be supported by one or more mission services such as mission critical push-to-talk (MCPTT), mission critical video (MCVideo), or mission critical data (MCData). Support for mission functions may include prioritization of services, and mission services may be used for public safety or general commercial applications. The terms ultra-reliable, low-latency, mission, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

The wireless communications system 100 may support one or multiple network slices over these one or multiple radio access technologies. Each network slice may provide specific network capabilities and network characteristics. For example, a network slice may include dedicated or shared resources of a wireless communications system in terms of processing power, storage, and bandwidth for a service or application. A network slice may also span across multiple network devices, for example, a base station, a network function of a core network, etc. A network function may be a logical node, which may be implemented in hardware, code (e.g., software or firmware) executed by a processor, or any combination thereof, to support network slices in the wireless communications system. Examples of network functions include an AMF, an authentication server function (AUSF), an NSSAA function (NSSAAF), a UDM function, and the like. The network device may alternatively be a provisioning server (PS) or an authentication authorization and accounting (AAA) server.

A UE 115 may support various types of services and applications using one or multiple network slices. A UE 115 may request, from a network device (e.g., a network function), a network slice for a service or application. As part of the request, the UE 115 may provide credentials for authentication and authorization of the network slice. In some cases, however, the UE 115 might not possess credentials for the authentication and authorization of the network slice, but may still provide the request to the network device (e.g., a network function). The network device may perform several operations as part of a network slice provisioning procedure to provision the UE 115 with the requested network slice, before determining that the UE 115 does not have credentials for the requested network slice. Because the UE 115 does not have the credentials for the requested network slice, the network slice provisioning procedure ultimately fails. As a result, the UE 115 might end in a deregistered state.

To improve network slice authentication and authorization, the UE 115 may be configured to inform, via a communication manager 102, a network device (e.g., a network function) that a network slice requires authentication and authorization prior to the UE 115 requesting it. The UE 115 may also be configured to inform, via the communication manager 102, the network device that it does not have credentials for the network slice. By informing the network device that the UE 115 does not have credentials for the network slice, the network device may provision the UE 115 with the credentials and avoid the UE 115 resulting in a deregistered state. Alternatively, the network device may be informed by another network device (e.g., another network function) that the UE 115 does not have the credentials for the network slice based on subscription information from the UE 115. Similarly, the network device may obtain the credentials from the other network device, and may provision the UE 115 with the credentials and thereby avoid the UE 115 from resulting in the deregistered state.

A base station 105 or a network function (e.g., an AMF) associated with a core network 130 may, via a communications manager 101, receive from the UE 115 an indication that a network slice requires authentication and authorization prior to the UE 115 requesting it. The base station 105 or the network function (e.g., an AMF) associated with a core network 130 may, via a communications manager 101, an indication from the UE 115 that it does not have credentials for the network slice. The base station 105 or the network function (e.g., an AMF) associated with a core network 130 may, via a communications manager 101, improve network slice authentication and authorization based on the received indication from the UE 115, or the like as described herein.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI- RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
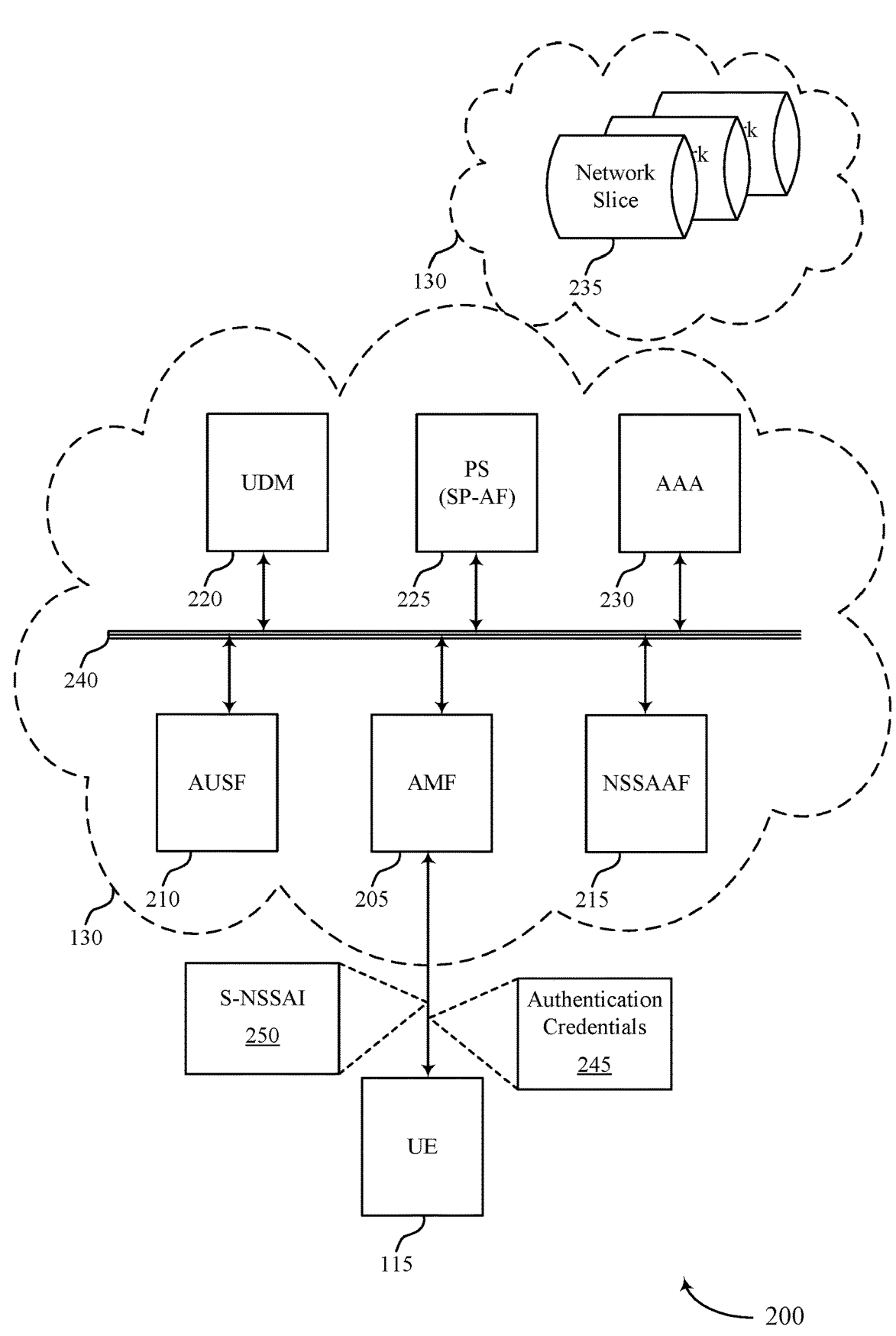

FIG. 2 illustrates an example of a wireless communications system 200 that supports NSSAA in accordance with one or more aspects of the present disclosure. In some examples, the wireless communications system 200 may implement aspects of the wireless communications system 100. For example, the wireless communications system 200 may include a UE 115, which may be examples of a corresponding UE 115 as described with reference to FIG. 1. The wireless communications system 200 may also include one or more network functions, for example, an AMF 205, an authentication server function (AUSF) 210, a NSSAA function (NSSAAF) 215, and a UDM 220 that facilitate authentication and authorization of one or more network slices 235 in the wireless communications system 200. The wireless communications system 200 may also include one or more servers, such as a provision server (PS) 225 and an access, authorization, and accounting (AAA) server 230. Each of the network functions and servers may be in communication with one another via one or more network interfaces 240. One or more of the network functions and servers may be physically located at various locations in a core network 130, including being distributed such that sub-components are implemented at different physical locations by one or more physical components. The wireless communications system 200 may include other network functions or devices not shown, or may exclude one or more of the network functions or devices shown.

The UE 115 may support various types of services and applications using one or multiple network slices 235. For example, a network slice 235 may support enhanced mobile broadband applications, or ultra-reliable low latency communication applications, or massive IoT applications, or a combination thereof. The UE 115 may request, from a network function, a network slice 235 for a service or application. For example, the UE 115 may provide the request as part of a registration procedure with one or more of the AMF 205, the AUSF 210, the NSSAAF 215, the UDM 220, the PS 225, or the AAA 230, or a combination thereof.

The AMF 205 may support registration management, connection management, reachability management, mobility management and various function relating to security and access management and authorization. The AUSF 210 may support security processes for the network slices 235. For example, the AUSF 210 may provide authentication credentials for the network slices 235. The NSSAAF 215 may provide authentication and authorization of a network slices 235 based on authentication credentials for the network slices 235. The UDM 220 may support authentication credential repository and processing, and may stores security credentials used in authentication for a network slice 235. In addition, the UDM 220 may stores subscription information associated with the UE 115. The PS 225 may facilitate requests, for configuration information, etc. associated with a service or application, received from the UE 115. The AAA 230 may determine identity and privileges of the UE 115 and to track that UE's 115 activities with respect to the subscription information.

Returning to the registration procedure, the UE 115 may provide authentication credentials 245 for authentication and authorization of a network slice 235. For example, the UE 115 may provide authentication credentials 245 associated with a single-network slice selection assistance information (S-NSSAI) 250, which is used to uniquely identify a network slice 235. In some examples, one or more upper layers of a protocol stack associated with the UE 115 may store an association between each S-NSSAI and its corresponding authentication credentials for NSSAA. In some cases, however, the UE 115 (e.g., the one or more upper layers) might not possess authentication credentials 245 for the authentication and authorization of the particular network slice 235, but may still provide the request to a network function (e.g., the AMF 205).

For example, the AMF 205 may perform several operations as part of the registration procedure to provision the UE 115 with the network slice 235, before determining that the UE 115 does not have authentication credentials 245 for the network slice 235. Because the UE 115 does not possess the authentication credentials 245 for the network slice 235, the registration procedure ultimately fails. As a result, the UE 115 might end in a deregistered state. For example, if NSSAA for all the network slices 235 fails then the AMF 205 performs the network-initiated de-registration procedure and includes a rejected NSSAI in a deregistration request. Thus, the registration procedure (e.g., an EAP operation) will fail since the UE 115 does not have credentials and if no-other S-NSSAIs are allowed (without NSSAA), the UE 115 will be in deregistered state.

To improve network slice authentication and authorization, the UE 115 may be configured to inform a network function (e.g., the AMF 205) that a network slice 235 is subject to authentication and authorization prior to the UE 115 requesting it. For example, the UE 115 may have URSP, which may include an indicator whether a respective S-NSSAI is subject to NSSAA. In some examples, a configured NSSAI may include an indicator whether the wireless communications system 200 (e.g., sPLMN) confirm that the respective S-NSSAI is subject to NSSAA. The UE 115 may also be configured to inform the network function (e.g., the AMF 205) that it does not have authentication credentials 245 for the network slice 235.

By informing the network function (e.g., the AMF 205) that the UE 115 does not have authentication credentials 245 for the network slice 235, the network function (e.g., the AMF 205) may provision the UE 115 with the authentication credentials 245 and avoid the UE 115 resulting in a deregistered state. Alternatively, the network function (e.g., the AMF 205) may be informed by another network function (e.g., the UDM 220) that the UE 115 does not have the authentication credentials 245 for the network slice 235 based on subscription information from the UE 115. Similarly, the network function (e.g., the AMF 205) may obtain the authentication credentials 245 from the other network function (e.g., the UDM 220), and may provision the UE 115 with the authentication credentials 245 and thereby avoid the UE 115 from resulting in the deregistered state.

Figure 3:
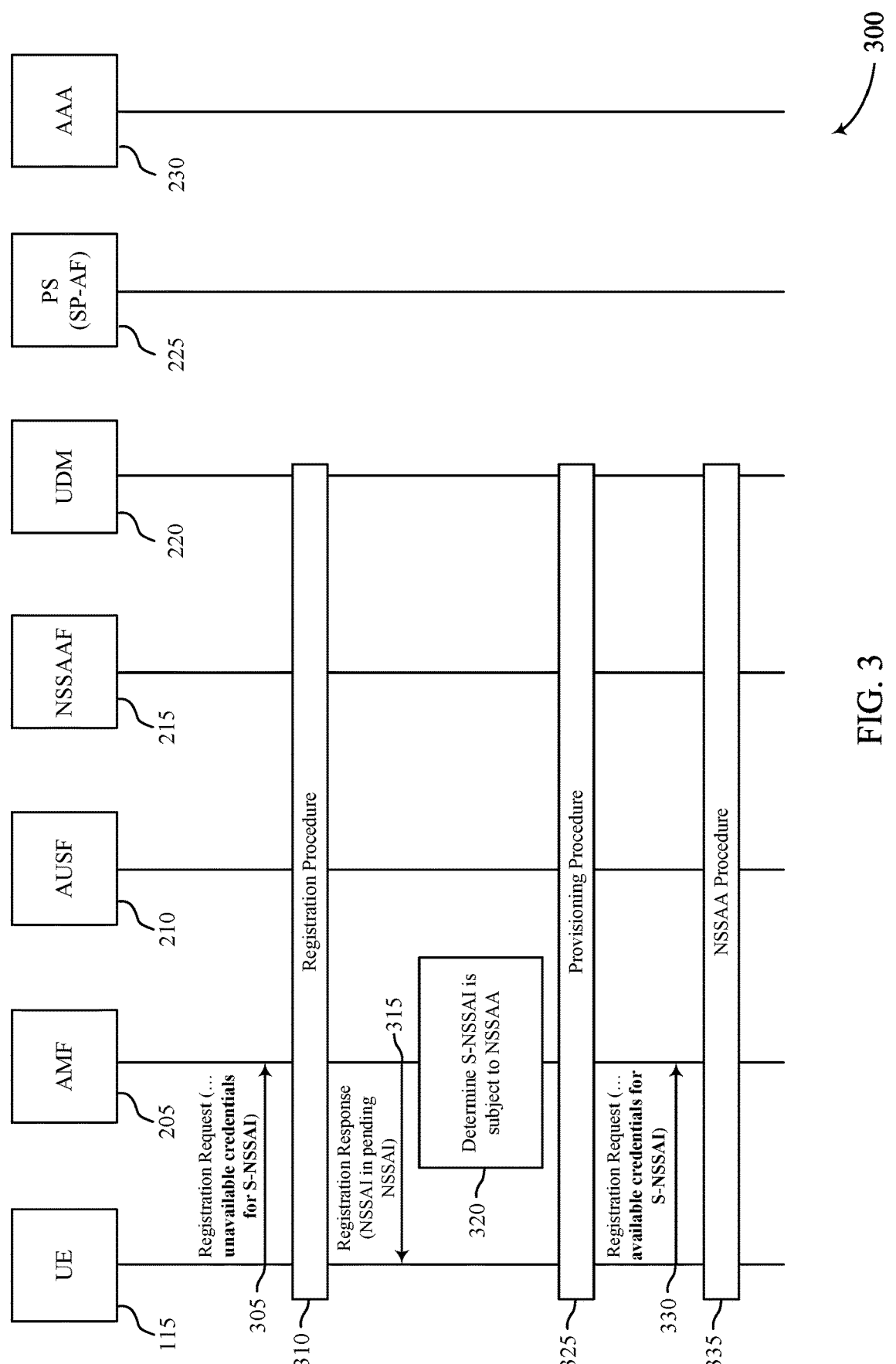
FIGS. 3 through 5 illustrate examples of process flows that support NSSAA in accordance with one or more aspects of the present disclosure.
Figure 4:
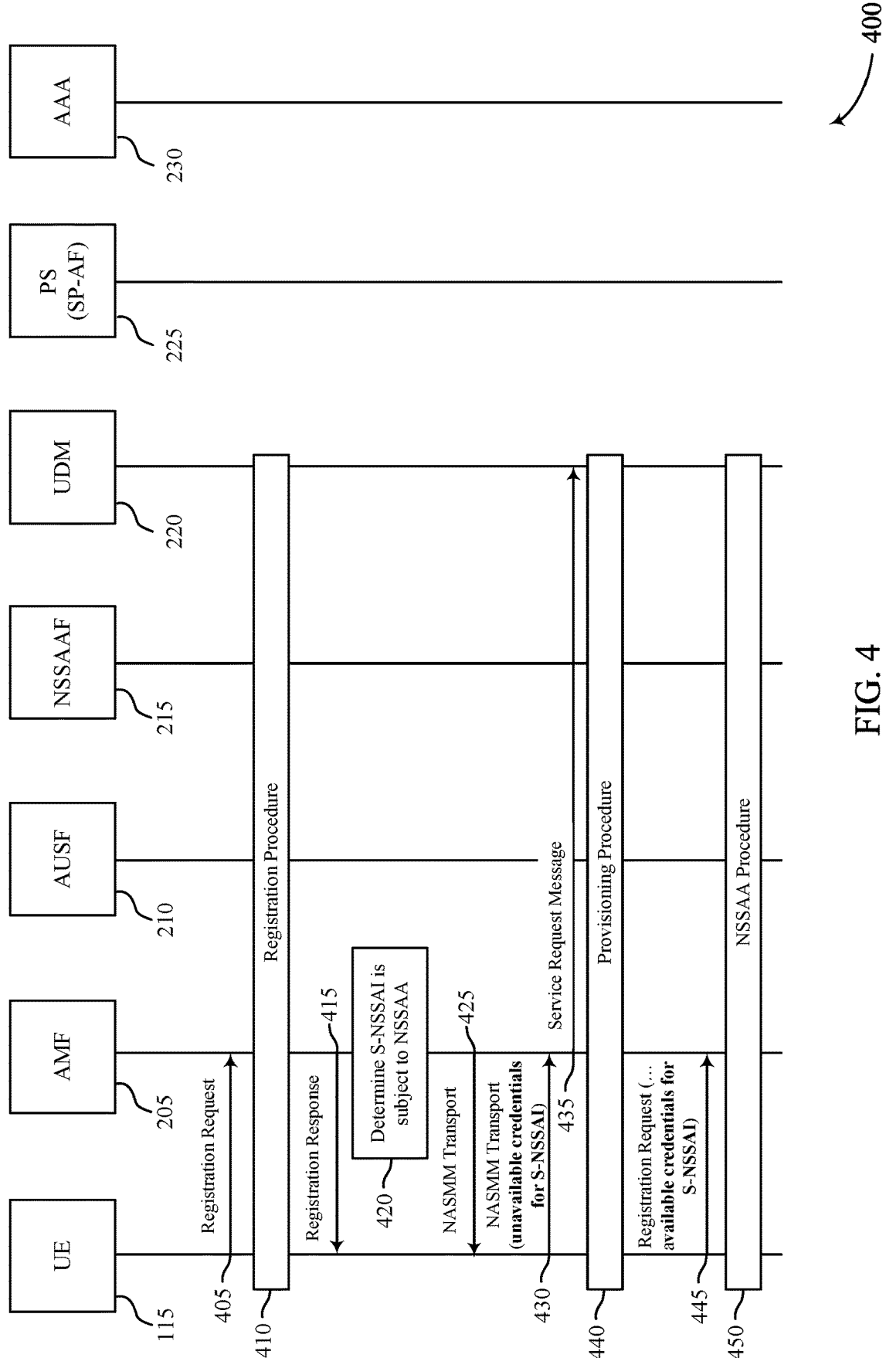
Figure 5:
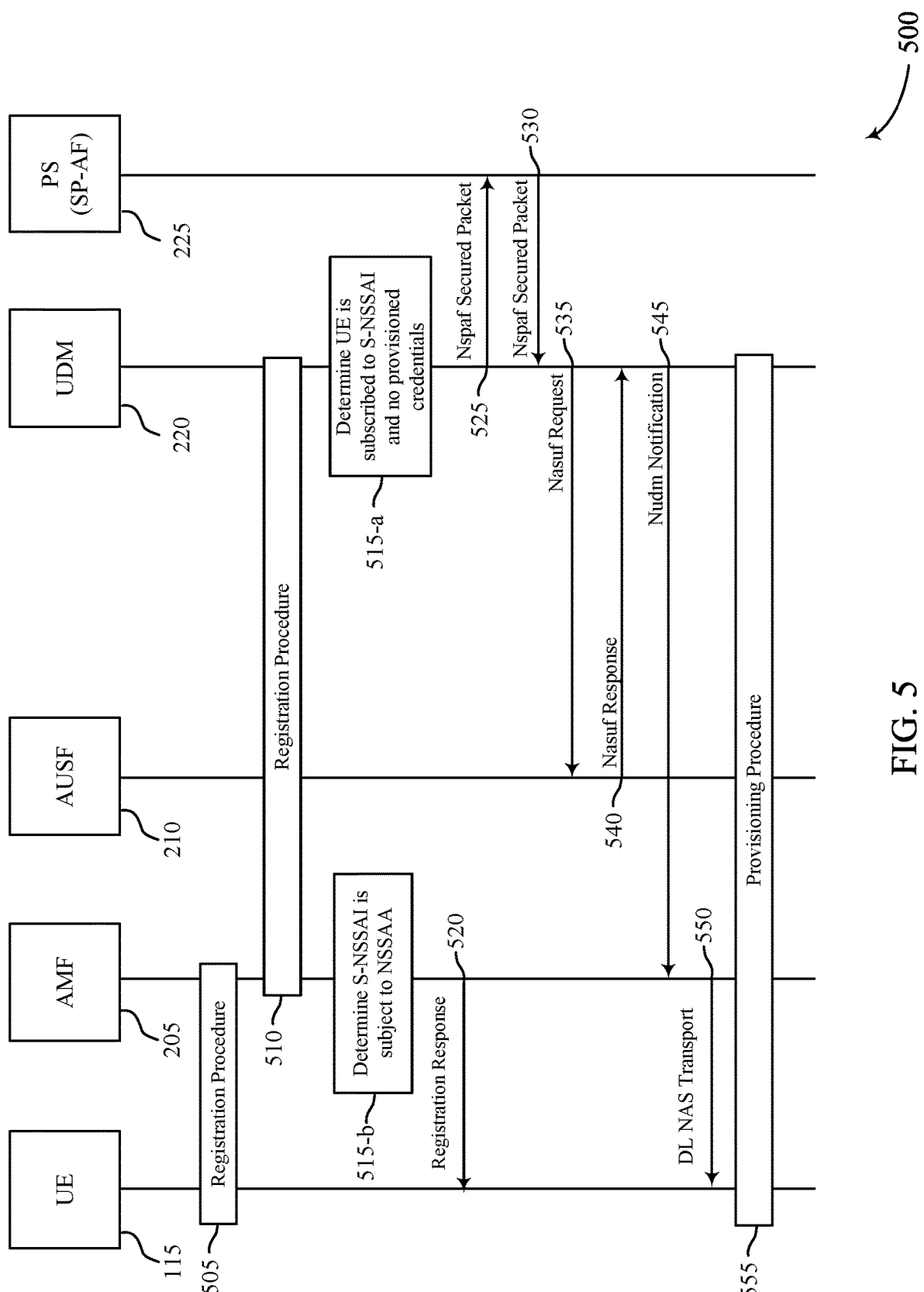

Therefore, in the wireless communications system 200, the UE 115 may be informed that a respective S-NSSAI is subject to NSSAA prior to requesting it. The UE 115 may also be configured to inform the AMF 205 that a respective S-NSSAI is subject to NSSAA and an indication of an availability of the authentication credentials 245 by the UE 115. Alternatively, the UDM 220 may inform the AMF 205 that a respective S-NSSAI is subject to NSSAA and an indication of an availability of the authentication credentials 245 by the UE 115. FIGS. 3 through 5 illustrates examples of process flows that support techniques for managing authentication and authorization of network slices in the wireless communications system 200.

FIG. 3 illustrates an example of a process flow 300 that supports NSSAA in accordance with one or more aspects of the present disclosure. The process flow 300 may implement aspects of the wireless communications system 100 and the wireless communications system 200 described with reference to FIGS. 1 and 2, respectively. The process flow 300 may be based on a configuration by a base station 105 and implemented by a UE 115 to promote power saving for the UE 115 by supporting enabling authentication and authorization of network slices. The process flow 300 may also be based on a configuration by the base station 105 and implemented by the UE 115 to promote high reliability and low latency NSSAA operations, among other benefits. In the following description of the process flow 300, the operations between the UE 115, an AMF 205, a AUSF 210, an NSSAAF 215, a UDM 220, a PS 225, and an AAA 230 may be transmitted in a different order than the example order shown, or the operations performed by the UE 115, the AMF 205, the AUSF 210, the NSSAAF 215, the UDM 220, the PS 225, and the AAA 230 may be performed in different orders or at different times. Some operations may also be omitted from the process flow 300, and other operations may be added to the process flow 300.

The UE 115 may support various types of services and applications using one or multiple network slices. In some examples, the UE 115 may determine to register with a network (e.g., a 4G network, a 5G network) to obtain access to the various types of services and applications. For example, the UE 115 may request, from a network device (e.g., a network function), a network slice for a service or application. In the example of FIG. 3, the process flow 300 may commence with a registration procedure between one or more of the UE 115, the AMF 205, the AUSF 210, the NSSAAF 215, and the UDM 220. For example, at 305, the UE 115 may transmit a registration request to the AMF 205. In some examples, the UE 115 may transmit the registration request directly to the AMF 205. In some other examples, the UE 115 may transmit the registration request indirectly to the AMF 205 via a radio access network (RAN) (e.g., a base station 105).

The registration request may include NSSAA capability information or a requested NSSAI (R-NSSAI), or both. In some examples, the UE 115 may determine an authentication credential associated with network slice information (also referred to as S-NSSAI). In the example of FIG. 3, the UE 115 may include, in the R-NSSAI, an indication of an availability of the authentication credential for the network slice information. For example, the indication may indicate that the authentication credential associated with the network slice information is available or unavailable for the UE 115. In other words, the UE 115 may indicate for a requested S-NSSAI that it does or does not have the authentication credential for the S-NSSAI. In some examples, the registration request may also include an AMF identifier, a temporary mobile subscriber identity (TMSI), etc.

At 310, one or more of the UE 115, the AMF 205, the AUSF 210, the NSSAAF 215, and the UDM 220 may continue with the registration procedure. For example, a RAN may select the AMF 205, which may be an old AMF or a new AMF because the serving AMF might have changed since a previous registration procedure for the UE 115. As part of the registration procedure, the AMF 205 may request a context transfer from the old AMF. The registration request received from the UE 115, at 305, may be included in the context request. The old AMF may pass the UE context to the AMF 205 (e.g., a new serving AMF). In some examples, the AMF 205 may request, from the UE 115, a subscription concealed identifier (SUCI), and the UE 115 may respond by providing the SUCI to the AMF 205.

The AMF 205 may request, from the AUSF 210, UE authentication and authorization information. The AMF 205 may receive, from the AUSF 210, the UE authentication and authorization information, and derive security keys (e.g., non-access stratum (NAS) keys, or the like). In some examples, the AMF 205 may receive, from the AUSF 210, a subscription permanent identifier (SUPI). As part of the registration procedure, the AMF 205 may initiate an authentication operation with the UE 115. The AMF 205 may, for example, transmit one or more authentication parameters to the UE 115, and the UE 115 may respond to the authentication parameters. The AMF 205 may also, as part of the registration procedure, signal a selected security algorithm to the UE 115, which the UE 115 may use to authenticate itself. Because the AMF has changed, the AMF 205 notifies the old AMF that the registration of the UE 115 in the new AMF is completed. The AMF 205 may also trigger an equipment identity check service associated with the UE 115 to check whether a permanent equipment identifier (PEI) is blacklisted (e.g., not allowed). In some examples, because the AMF has changed, the AMF 205 may register with the UDM 220, as part of the registration procedure. The AMF 205 may retrieve access and mobility subscription data, and the UDM 220 may respond with the requested data.

At 315, the AMF 205 may transmit a registration response to the UE 115. The registration response may associate the network slice information (e.g., S-NSSAI) to a list of pending network slice information. That is, the AMF 205 puts S-NSSAI in a pending NSSAI list, but does not send an EAP identifier request for this S-NSSAI to the UE 115. At 320, the AMF 205 may determine that the network slice information (e.g., S-NSSAI) is subject to NSSAA. In other words, the AMF 205 may detect that certain S-NSSAI-A is subject to NSSAA, but the UE 115 might not have provisioned credentials and the AMF 205 does not trigger EAP for this S-NSSAI.

At 325, one or more of the UE 115, the AMF 205, the AUSF 210, the NSSAAF 215, and the UDM 220 perform a provisioning procedure. For example, the UE 115 in a user-plane or the UDM 220 in a control-plane proceeds with provisioning of credentials from the NSSAAF 215, depending on whether it already has user-plane connectivity from other S-NSSAIs or control-plane using a UE parameters update procedure. When the provisioning is successfully completed, the UE 115 may, at 330, transmit a new registration request, which may indicate this time that the UE 115 has credentials for NSSAA for the S-NSSAI. At 335, one or more of the UE 115, the AMF 205, the AUSF 210, the NSSAAF 215, and the UDM 220 may perform an NSSAA procedure. For example, the AMF 205 may proceed with an EAP identifier request and facilitate the NSSAA procedure for the S-NSSAI. Based on the NSSAA procedure, the UE 115 may obtain access to various types of services and applications using one or multiple network slices associated with the S-NSSAI. For example, the UE 115 may obtain access to a network slice supporting eMBB, URLLC, MTC, or the like.

FIG. 4 illustrates an example of a process flow 400 that supports NSSAA in accordance with one or more aspects of the present disclosure. The process flow 400 may implement aspects of the wireless communications system 100 and the wireless communications system 200 described with reference to FIGS. 1 and 2, respectively. The process flow 400 may be based on a configuration by a base station 105 and implemented by a UE 115 to promote power saving for the UE 115 by supporting enabling authentication and authorization of network slices. The process flow 400 may also be based on a configuration by the base station 105 and implemented by the UE 115 to promote high reliability and low latency NSSAA operations, among other benefits. In the following description of the process flow 400, the operations between the UE 115, an AMF 205, a AUSF 210, an NSSAAF 215, a UDM 220, a PS 225, and an AAA 230 may be transmitted in a different order than the example order shown, or the operations performed by the UE 115, the AMF 205, the AUSF 210, the NSSAAF 215, the UDM 220, the PS 225, and the AAA 230 may be performed in different orders or at different times. Some operations may also be omitted from the process flow 400, and other operations may be added to the process flow 400.

The UE 115 may support various types of services and applications using one or multiple network slices. In some examples, the UE 115 may determine to register with a network (e.g., a 4G network, a 5G network) to obtain access to the various types of services and applications. For example, the UE 115 may request, from a network device (e.g., a network function), a network slice for a service or application. In the example of FIG. 4, the process flow 400 may commence with a registration procedure between one or more of the UE 115, the AMF 205, the AUSF 210, the NSSAAF 215, and the UDM 220. For example, at 405, the UE 115 may transmit a registration request to the AMF 205. In some examples, the UE 115 may transmit the registration request directly to the AMF 205. In some other examples, the UE 115 may transmit the registration request indirectly to the AMF 205 via a RAN (e.g., a base station 105). The registration request may include NSSAA capability information or a requested NSSAI (R-NSSAI), or both.

At 410, one or more of the UE 115, the AMF 205, the AUSF 210, the NSSAAF 215, and the UDM 220 may continue with the registration procedure. For example, a RAN may select the AMF 205, which may be an old AMF or a new AMF because the serving AMF might have changed since a previous registration procedure for the UE 115. As part of the registration procedure, the AMF 205 may request a context transfer from the old AMF. The registration request received from the UE 115, at 305, may be included in the context request. The old AMF may pass the UE context to the AMF 205 (e.g., a new serving AMF). In some examples, the AMF 205 may request, from the UE 115, a SUCI, and the UE 115 may respond by providing the SUCI to the AMF 205.

The AMF 205 may request, from the AUSF 210, UE authentication and authorization information. The AMF 205 may receive, from the AUSF 210, the UE authentication and authorization information, and derive security keys (e.g., NAS keys, or the like). In some examples, the AMF 205 may receive, from the AUSF 210, a SUPI. As part of the registration procedure, the AMF 205 may initiate an authentication operation with the UE 115. The AMF 205 may, for example, transmit one or more authentication parameters to the UE 115, and the UE 115 may respond to the authentication parameters. The AMF 205 may also, as part of the registration procedure, signal a selected security algorithm to the UE 115, which the UE 115 may use to authenticate itself. Because the AMF has changed, the AMF 205 notifies the old AMF that the registration of the UE 115 in the new AMF is completed. The AMF 205 may also trigger an equipment identity check service associated with the UE 115 to check whether a PEI is blacklisted (e.g., not allowed). In some examples, because the AMF has changed, the AMF 205 may register with the UDM 220, as part of the registration procedure. The AMF 205 may retrieve access and mobility subscription data, and the UDM 220 may respond with the requested data.

At 415, the AMF 205 may transmit a registration response to the UE 115. The registration response may associate the network slice information (e.g., S-NSSAI) to a list of pending network slice information. That is, the AMF 205 may store the S-NSSAI in a pending NSSAI list, and send an EAP identifier request for this S-NSSAI to the UE 115. At 420, the AMF 205 may determine that network slice information (e.g., S-NSSAI) is subject to NSSAA. In other words, the AMF 205 may detect that certain S-NSSAI-A requires NSSAA. At 425, the AMF 205 may transmit a non-access stratum mobility management (NASMM) request message (e.g., a NASMM transport message). The NASMM request message may including an EAP identifier based on that the network slice information is subject to NSSAA. At 430, the UE 115 may respond with a NASMM response message (e.g., a NASMM transport message).

In some examples, the UE 115 may determine an authentication credential associated with network slice information (also referred to as S-NSSAI). In the example of FIG. 4, the UE 115 may provide, in the NASMM transport message, an indication of an availability of the authentication credential for the network slice information. For example, the indication may indicate that the authentication credential associated with the network slice information is available or unavailable at the UE 115. In other words, the UE 115 may indicate for a requested S-NSSAI that it does or does not have the authentication credential for an S-NSSAI. As such, the UE 115 may response to the EAP identifier request indicating that it does or does not have the authentication credential for an S-NSSAI.

At 435, the AMF 205 may transmit a service request message to the UDM 220. The service request message may trigger provisioning of the authentication credential associated with the network slice information for the UE 115. In some examples, the service request message may include an indication indicating that the authentication credential associated with the network slice information is unavailable at the UE 115. At 440, one or more of the UE 115, the AMF 205, the AUSF 210, the NSSAAF 215, and the UDM 220 perform a provisioning procedure. For example, the UE 115 for a user-plane or the UDM 220 for a control-plane proceeds with provisioning of credentials from the NSSAAF 215, depending on whether it already has user-plane connectivity from other S-NSSAIs or control-plane using a UE parameters update procedure. When the provisioning is successfully completed, the UE 115 may, at 445, transmit a new registration request, which may indicate this time that the UE 115 has credentials for NSSAA for the S-NSSAI. At 450, one or more of the UE 115, the AMF 205, the AUSF 210, the NSSAAF 215, and the UDM 220 may perform an NSSAA procedure. For example, the AMF 205 may proceed with an EAP identifier request and facilitate the NSSAA procedure. Based on the NSSAA procedure, the UE 115 may obtain access to various types of services and applications using one or multiple instantiated network slices associated with the S-NSSAI. For example, the UE 115 may obtain access to a network slice for low latency (e.g., URLLC). Based on the UE 115 gaining access to the network slice supporting URLLC, the UE 115 may perform one or more communications operations (e.g., mission critical operations) utilizing the instantiated network slices. As another example, the UE 115 may obtain access to a network slice supporting high bandwidth operations (e.g., eMBB). Based on the UE 115 gaining access to the network slice supporting high bandwidth operations, the UE 115 may conduct one or more communications operations over the network slice (e.g., video streaming).

FIG. 5 illustrates an example of a process flow 500 that supports NSSAA in accordance with one or more aspects of the present disclosure. The process flow 500 may implement aspects of the wireless communications system 100 and the wireless communications system 200 described with reference to FIGS. 1 and 2, respectively. The process flow 500 may be based on a configuration by a base station 105 and implemented by a UE 115 to promote power saving for the UE 115 by supporting enabling authentication and authorization of network slices. The process flow 500 may also be based on a configuration by the base station 105 and implemented by the UE 115 to promote high reliability and low latency NSSAA operations, among other benefits. In the following description of the process flow 500, the operations between the UE 115, an AMF 205, a AUSF 210, a UDM 220, and a PS 225 may be transmitted in a different order than the example order shown, or the operations performed by the UE 115, the AMF 205, the AUSF 210, the UDM 220, and the PS 225 may be performed in different orders or at different times. Some operations may also be omitted from the process flow 500, and other operations may be added to the process flow 500.

The UE 115 may support various types of services and applications using one or multiple network slices. In some examples, the UE 115 may determine to register with a network (e.g., a 5G network) to obtain access to the various types of services and applications. For example, the UE 115 may request, from a network device (e.g., a network function), a network slice for a service or application. In the example of FIG. 5, the process flow 500 may commence with a registration procedure between one or more of the UE 115, the AMF 205, the AUSF 210, the NSSAAF 215, and the UDM 220. For example, at 505, the UE 115 may perform a registration procedure with the AMF 205. As part of the registration procedure, the UE 115 may transmit a registration request to the AMF 205. In some examples, the UE 115 may transmit the registration request directly to the AMF 205. In some other examples, the UE 115 may transmit the registration request indirectly to the AMF 205 via a RAN (e.g., a base station 105). The registration request may include NSSAA capability information or a requested NSSAI (R-NSSAI), or both.

At 510, one or more of the AMF 205, the AUSF 210, and the UDM 220 may continue with the registration procedure. For example, a RAN may select the AMF 205, which may be an old AMF or a new AMF because the serving AMF might have changed since a previous registration procedure for the UE 115. As part of the registration procedure, the AMF 205 may request a context transfer from the old AMF. The registration request received from the UE 115 may be included in the context request. The old AMF may pass the UE context to the AMF 205 (e.g., a new serving AMF). In some examples, the AMF 205 may request, from the UE 115, a SUCI, and the UE 115 may respond by providing the SUCI to the AMF 205.

The AMF 205 may request, from the AUSF 210, UE authentication and authorization information. The AMF 205 may receive, from the AUSF 210, the UE authentication and authorization information, and derive security keys (e.g., NAS keys, or the like). In some examples, the AMF 205 may receive, from the AUSF 210, a SUPI. In some examples, because the AMF has changed, the AMF 205 may register with the UDM 220, as part of the registration procedure. The AMF 205 may retrieve access and mobility subscription data, and the UDM 220 may respond with the requested data.

At 515-b, the UDM 220 may determine that the UE 115 is subscribed to the S-NSSAI and has no provisioned credentials. For example, the UDM 220 may based on a new subscription flag that the UE 115 is subscribed to the S-NSSAI for which the UE 115 does not have provisioned NSSAA credentials. At 515-b, the AMF 205 may determine that S-NSSAI is subject to NSSAA. For example, the AMF 205 may determine that some S-NSSAI require NSSAA, but the UE 115 has no provisioned credentials and the AFM does not trigger an EAP identifier request for this S-NSSAI. The AMF 205 may trigger a timer based on this determination. In some examples, the AMF 205 may transmit the EAP identifier request based on the timer lapsing. At 520, the AMF 205 may transmit a registration response to the UE 115. The registration response may associate the network slice information (e.g., S-NSSAI) to a list of pending network slice information.

The UDM 220 may perform a UE parameter update procedure to provision the authentication credential associated with the network slice information. As part of the UE parameter update procedure, the UDM may, at 525, transmit a secured request packet (e.g., a Nspaf secured packet) to the PS 225, which may respond, at 530, with a secured response packet (e.g., a Nspaf secured packet). The UDM 220 may request, from the AUSF 210, UE authentication and authorization information. At 535, the UDM 220 may provide the AUSF 210 with a device identifier and the secured packet received from the PS 225. At 540, the AUSF 210 may respond with the authentication and authorization information. At 545, the UDM 220 may transmit, to the AMF 205, the authentication and authorization information obtained from the AUSF 210. At 550, the AMF may transmit, to the UE 115, a NASMM message, which may include authentication and authorization information for the UE 115. At 555, one or more of the UE 115, the AMF 205, the AUSF 210, the UDM 220, and the PS 225 may perform a provisioning procedure. In some examples, prior to the provisioning procedure, the UE 115 may respond with a NASMM message (e.g., a NASMM transport message), in response to the NASAMM message received from the AMF 205.

Figure 6:
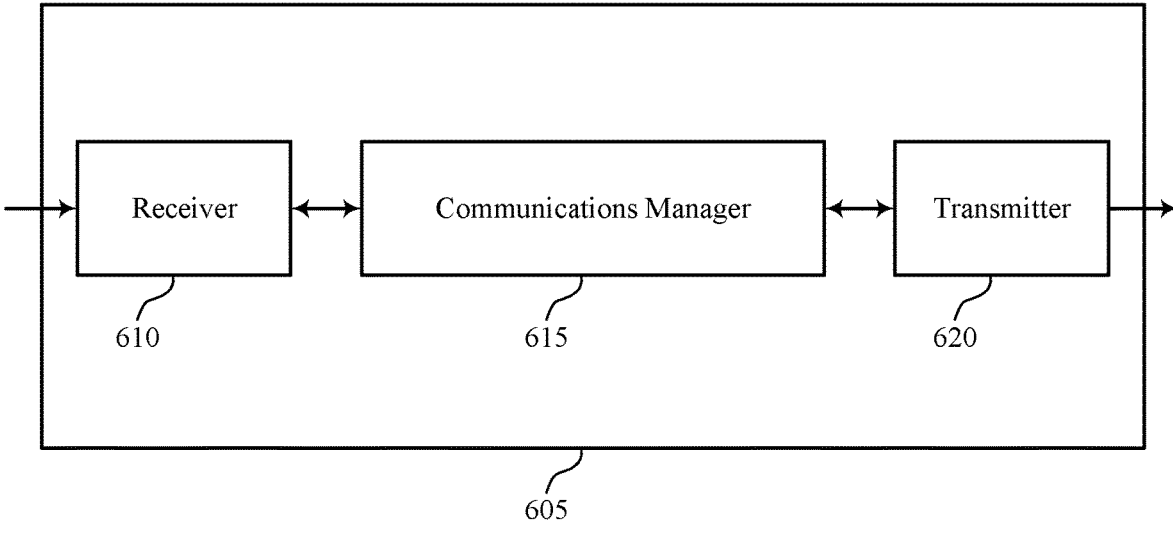
FIGS. 6 and 7 show block diagrams of devices that support NSSAA in accordance with one or more aspects of the present disclosure.

FIG. 6 shows a block diagram 600 of a device 605 that supports NSSAA in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to NSSAA, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may configure an indication associated with network slice information, determine, based on the indication, that the network slice information is subject to NSSAA, and access a network slice associated with the network slice information based on the NSSAA of the network slice information. The communications manager 615 may also determine an authentication credential associated with network slice information, transmit, to an AMF, a first indication related to an availability of an authentication credential associated with the network slice information. The communications manager 615 may access, in response to NSSAA of the network slice information, a network slice associated with the network slice information based on the transmitted first indication related to the availability of the authentication credential associated with the network slice information. The communications manager 615 may be an example of aspects of the communications manager 910 described herein.

The communications manager 615 may enable the device 605 to provide improvements to NSSAA operations. In some implementations, the communications manager 615 may enable the device 605 to determine an availability of authentication credentials for one or multiple network slices. Additionally or alternatively, the communications manager 615 may enable the device 605 to inform a network device (e.g., an AMF) of the availability of the authentication credentials for a network slice. Based on implementing these operations, one or more processors of the device 605 (e.g., processor(s) controlling or incorporated with the communications manager 615) may reduce a latency and increase a reliability associated with the NSSAA, and thereby reduce power consumption and promote high reliability network slice operations, among other benefits.

The communications manager 615 may be an example of means for performing various aspects of techniques for managing authentication and authorization of network slices. The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device. In some examples, the communications manager 615 may be configured to perform various operations (e.g., managing authentication and authorization of network slices) using or otherwise in cooperation with the receiver 510, the transmitter 520, or both.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
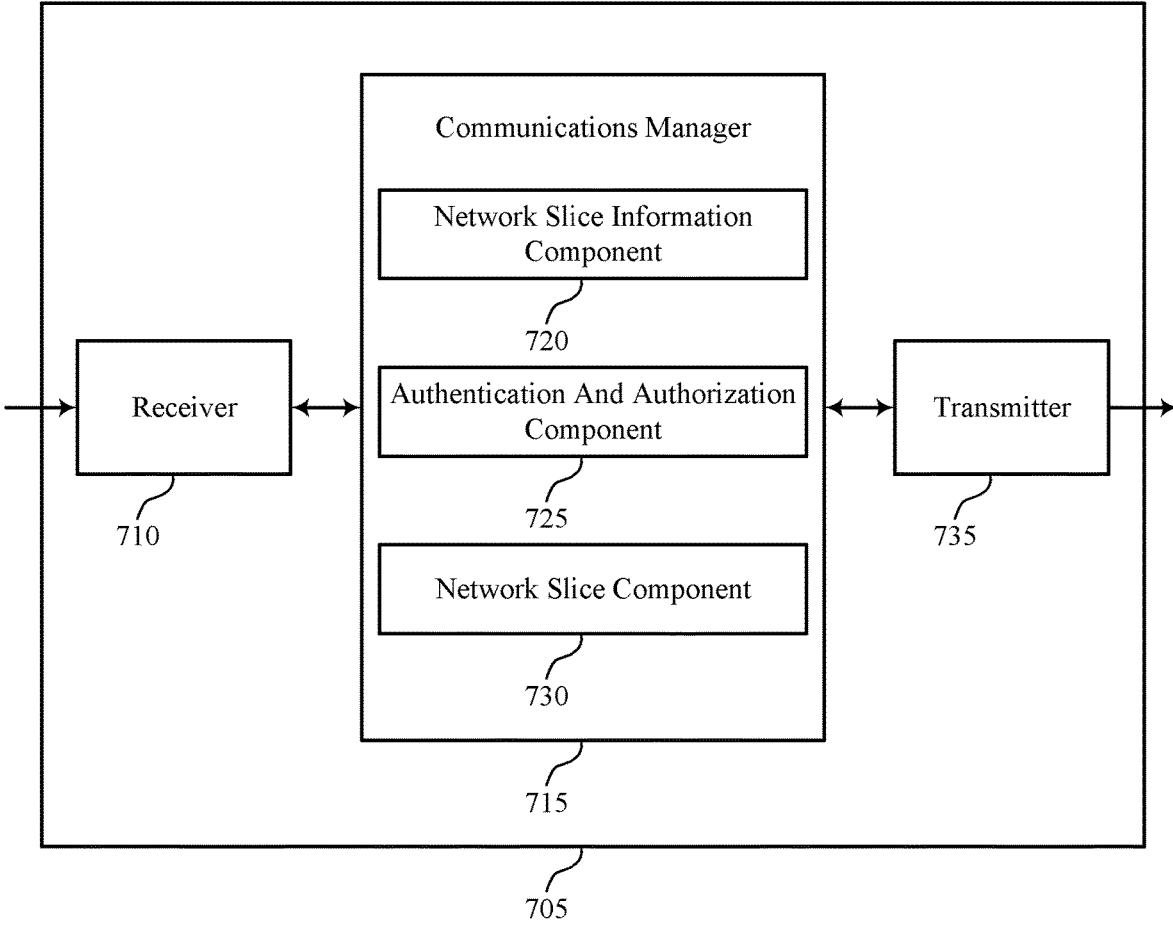

FIG. 7 shows a block diagram 700 of a device 705 that supports NSSAA in accordance with one or more aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to NSSAA, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a network slice information component 720, an authentication and authorization component 725, and a network slice component 730. The communications manager 715 may be an example of aspects of the communications manager 910 described herein.

The network slice information component 720 may configure an indication associated with network slice information. The authentication and authorization component 725 may determine, based on the indication, that the network slice information is subject to NSSAA. The network slice component 730 may access a network slice associated with the network slice information based on the NSSAA of the network slice information. Additionally or alternatively, the authentication and authorization component 725 may determine an authentication credential associated with network slice information. The network slice information component 720 may transmit, to an AMF, a first indication related to an availability of an authentication credential associated with the network slice information. The network slice component 730 may access, in response to NSSAA of the network slice information, a network slice associated with the network slice information based on the transmitted first indication related to the availability of the authentication credential associated with the network slice information.

The transmitter 735 may transmit signals generated by other components of the device 705. In some examples, the transmitter 735 may be collocated with a receiver 710 in a transceiver component. For example, the transmitter 735 may be an example of aspects of the transceiver 920 described with reference to FIG. 9. The transmitter 735 may utilize a single antenna or a set of antennas.

FIG. 8 shows a block diagram 800 of a communications manager 805 that supports NSSAA in accordance with one or more aspects of the present disclosure. The communications manager 805 may be an example of aspects of a communications manager 615, a communications manager 715, or a communications manager 910 described herein. The communications manager 805 may include a network slice information component 810, an authentication and authorization component 815, a network slice component 820, and a policy component 825. Each of these components may communicate, directly or indirectly, with one another (e.g., via one or more buses). One or more of these components may be means for supporting authentication and authorization of network slices.

The network slice information component 810 may configure an indication associated with network slice information. In some examples, the network slice information component 810 may transmit, to an AMF, a first indication related to an availability of an authentication credential associated with the network slice information. In some cases, the first indication indicates that the authentication credential associated with the network slice information is available or unavailable at the UE. In some examples, the network slice information component 810 may receive, from a SPLMN, a second message including a second indication that the network slice information is subject to the NSSAA.

The network slice information component 810 may transmit, to the AMF, a first registration request message including the first indication related to the availability of the authentication credential associated with the network slice information. The first indication may indicate that the authentication credential is unavailable at the UE. The registration request message further includes NSSAA capability information. In some examples, the network slice information component 810 may receive, from the AMF, a registration response message associating the network slice information to a list of pending network slice information.

The authentication and authorization component 815 may determine, based on the indication, that the network slice information is subject to NSSAA. In some examples, the authentication and authorization component 815 may determine an authentication credential associated with network slice information. In some examples, the authentication and authorization component 815 may receive, from a NSSAA function, the authentication credential associated with the network slice information in a user-plane associated with the UE based on the transmitted first indication indicating that the authentication credential is unavailable at the UE. In some examples, the authentication and authorization component 815 may receive, from a UDM function, the authentication credential associated with the network slice information in a control-plane associated with the UE based on transmitting, to the AMF, the first indication related to the availability of the authentication credential associated with the network slice information.

The authentication and authorization component 815 may transmit, to the AMF, a second registration request message including a second indication related to the availability of the authentication credential associated with the network slice information. The second indication may indicate that the authentication credential is available at the UE. In some examples, the authentication and authorization component 815 may receive, from the AMF, a non-access stratum mobility management request message including an EAP identifier request based on that the network slice information is subject to NSSAA. In some examples, the authentication and authorization component 815 may transmit, to the AMF, a non-access stratum mobility management response message including a second indication related to the availability of the authentication credential associated with the network slice information, the second indication indicating that the authentication credential associated with the network slice information is unavailable at the UE.

The network slice component 820 may access a network slice associated with the network slice information based on the NSSAA of the network slice information. In some examples, the network slice component 820 may access, in response to NSSAA of the network slice information, a network slice associated with the network slice information based on the transmitted first indication related to the availability of the authentication credential associated with the network slice information. The policy component 825 may determine UE route selection policy, where determining that the network slice information is subject to the NSSAA is based on the UE route selection policy. In some cases, the UE route selection policy includes the indication that the network slice information is subject to NSSAA.

Figure 9:
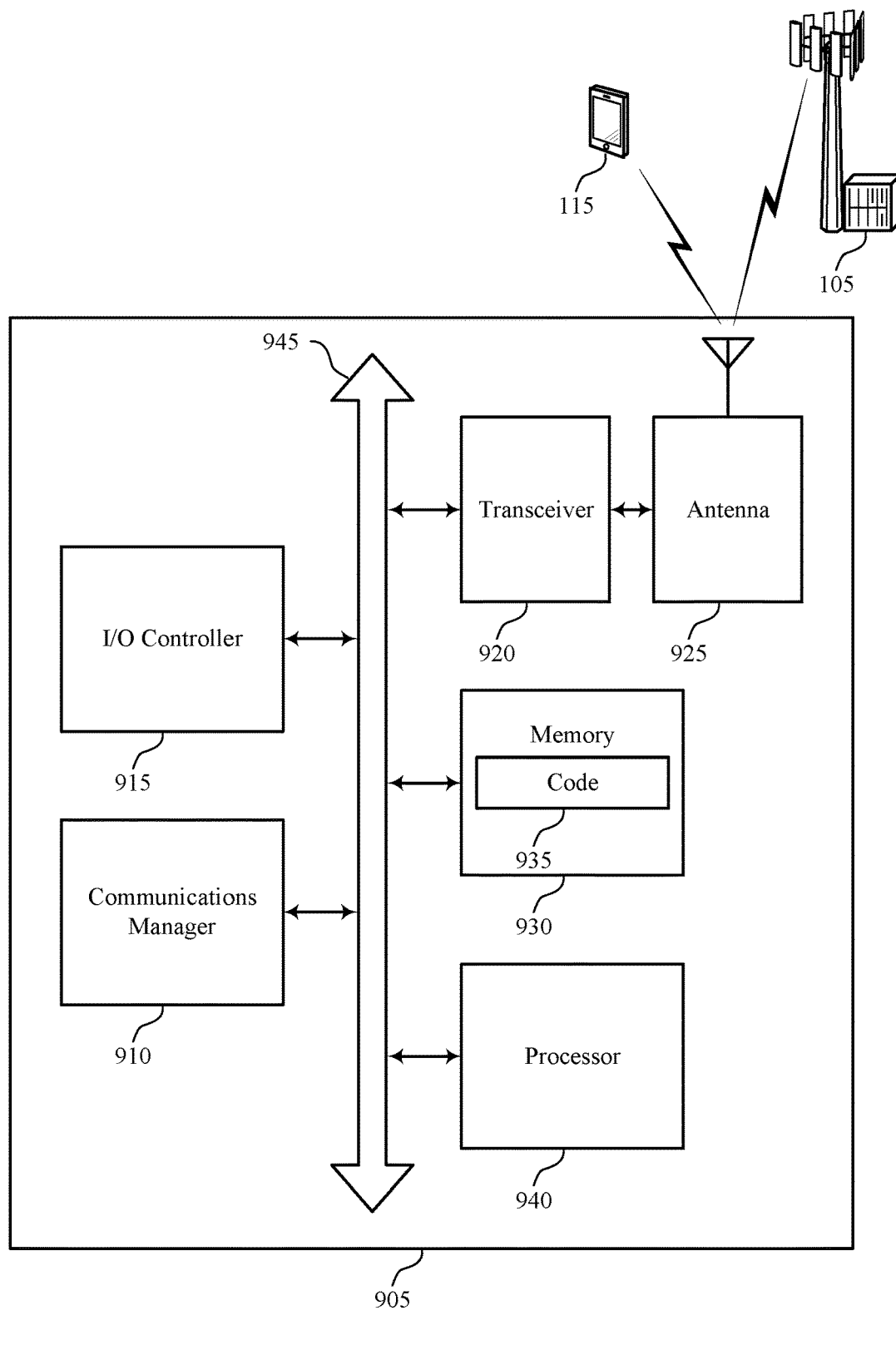
FIG. 9 shows a diagram of a system including a device that supports NSSAA in accordance with one or more aspects of the present disclosure.

FIG. 9 shows a diagram of a system 900 including a device 905 that supports NSSAA in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may configure an indication associated with network slice information, determine, based on the indication, that the network slice information is subject to NSSAA, and access a network slice associated with the network slice information based on the NSSAA of the network slice information. The communications manager 910 may also determine an authentication credential associated with network slice information, transmit, to an AMF, a first indication related to an availability of an authentication credential associated with the network slice information. The communications manager 910 may access, in response to NSSAA of the network slice information, a network slice associated with the network slice information based on the transmitted first indication related to the availability of the authentication credential associated with the network slice information.

The communications manager 910 may enable the device 905 to provide improvements to NSSAA operations. In some implementations, the communications manager 910 may enable the device 905 to determine an availability of authentication credentials for one or multiple network slices. Additionally or alternatively, the communications manager 910 may enable the device 905 to inform a network device (e.g., an AMF) of the availability of the authentication credentials for a network slice. Based on implementing these operations, one or more processors of the device 905 (e.g., processor(s) controlling or incorporated with the communications manager 910) may reduce a latency and increase a reliability associated with the NSSAA, and thereby reduce power consumption and promote high reliability network slice operations, among other benefits.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touch-screen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor 940 to perform various functions described herein. In some cases, the memory 930 may contain, among other things, a BIOS which may control basic hardware or software operation such as the interaction with peripheral components or devices. The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting NSSAA).

Figure 10:
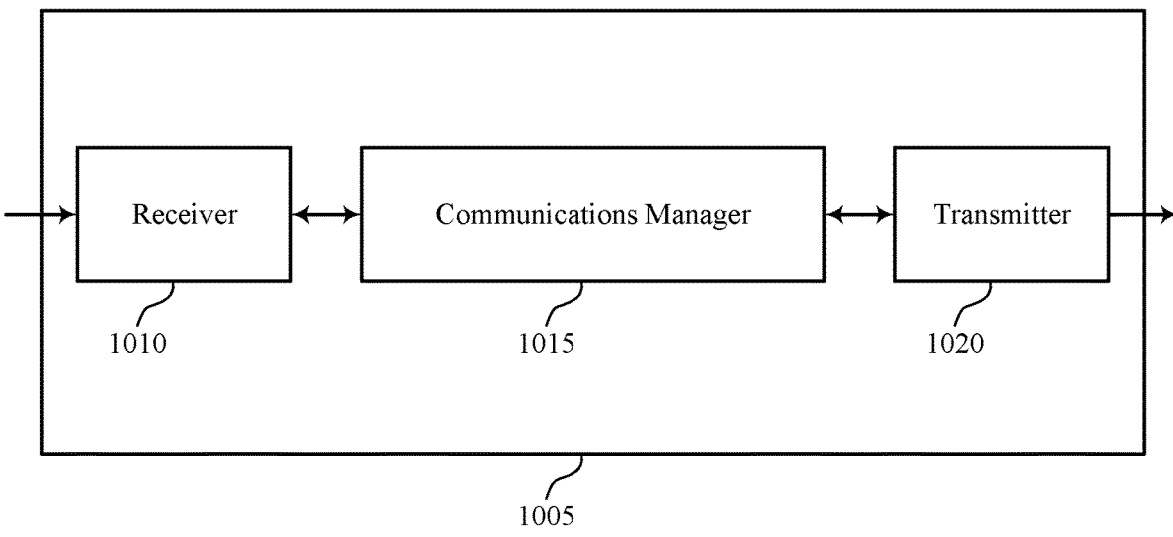
FIGS. 10 and 11 show block diagrams of devices that support NSSAA in accordance with one or more aspects of the present disclosure.

FIG. 10 shows a block diagram 1000 of a device 1005 that supports NSSAA in accordance with one or more aspects of the present disclosure. The device 1005 may be an example of aspects of a base station, a network function (e.g., an AMF, an AUSF, a NSSAAF, a UDM), or a server (e.g., a PS, an AAA) as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to NSSAA, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a first indication related to an availability of an authentication credential associated with network slice information, determine, based on the first indication, that the network slice information is subject to NSSAA, and provision the authentication credential associated with the network slice information for a UE based on the determining. The communications manager 1015 may also determine a subscription to network slice information by a UE, determine that the network slice information is subject to NSSAA, and transmit, to an AMF, an indication related to the authentication credential associated with the network slice information, the indication indicating that the authentication credential associated with the network slice information is unavailable at the UE. The communications manager 1015 may also receive, from a UDM function, a request message to provision an authentication credential associated with network slice information for a UE based on the UE having a subscription to the network slice information and the network slice information being subject to NSSAA and transmit, to the UDM function, a response message including provisioning information for the authentication credential associated with the network slice information. The communications manager 1015 may be an example of aspects of the communications manager 1310 described herein.

The communications manager 1015 may be an example of means for performing various aspects of techniques for managing authentication and authorization of network slices. The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
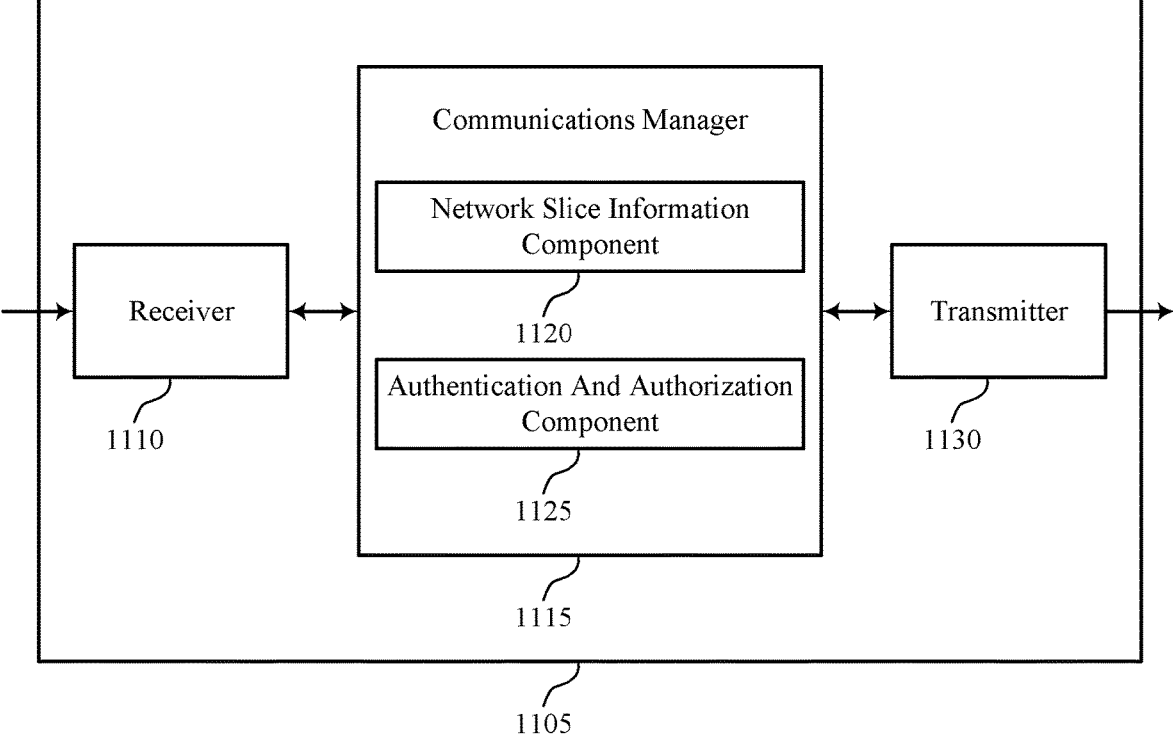

FIG. 11 shows a block diagram 1100 of a device 1105 that supports NSSAA in accordance with one or more aspects of the present disclosure. The device 1105 may be an example of aspects of a device 1005, a base station, a network function (e.g., an AMF, an AUSF, a NSSAAF, a UDM), or a server (e.g., a PS, an AAA) as described herein. The device

1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to NSSAA, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a network slice information component 1120 and an authentication and authorization component 1125. One or more of these components may be means for supporting authentication and authorization of network slices. The communications manager 1115 may be an example of aspects of the communications manager 1310 described herein.

In some examples, the network slice information component 1120 may receive a first indication related to an availability of an authentication credential associated with network slice information. The authentication and authorization component 1125 may determine, based on the first indication, that the network slice information is subject to NSSAA and provision the authentication credential associated with the network slice information for a UE based on the determining. In some other examples, the network slice information component 1120 may determine a subscription to network slice information by a UE and determine that the network slice information is subject to NSSAA. The authentication and authorization component 1125 may transmit, to an AMF, an indication related to the authentication credential associated with the network slice information, the indication indicating that the authentication credential associated with the network slice information is unavailable at the UE. In other examples, the authentication and authorization component 1125 may receive, from a UDM function, a request message to provision an authentication credential associated with network slice information for a UE based on the UE having a subscription to the network slice information and the network slice information being subject to NSSAA. The network slice information component 1120 may transmit, to the UDM function, a response message including provisioning information for the authentication credential associated with the network slice information.

The transmitter 1130 may transmit signals generated by other components of the device 1105. In some examples, the transmitter 1130 may be collocated with a receiver 1110 in a transceiver component. For example, the transmitter 1130 may be an example of aspects of the transceiver 1320 described with reference to FIG. 13. The transmitter 1130 may utilize a single antenna or a set of antennas.

Figure 12:
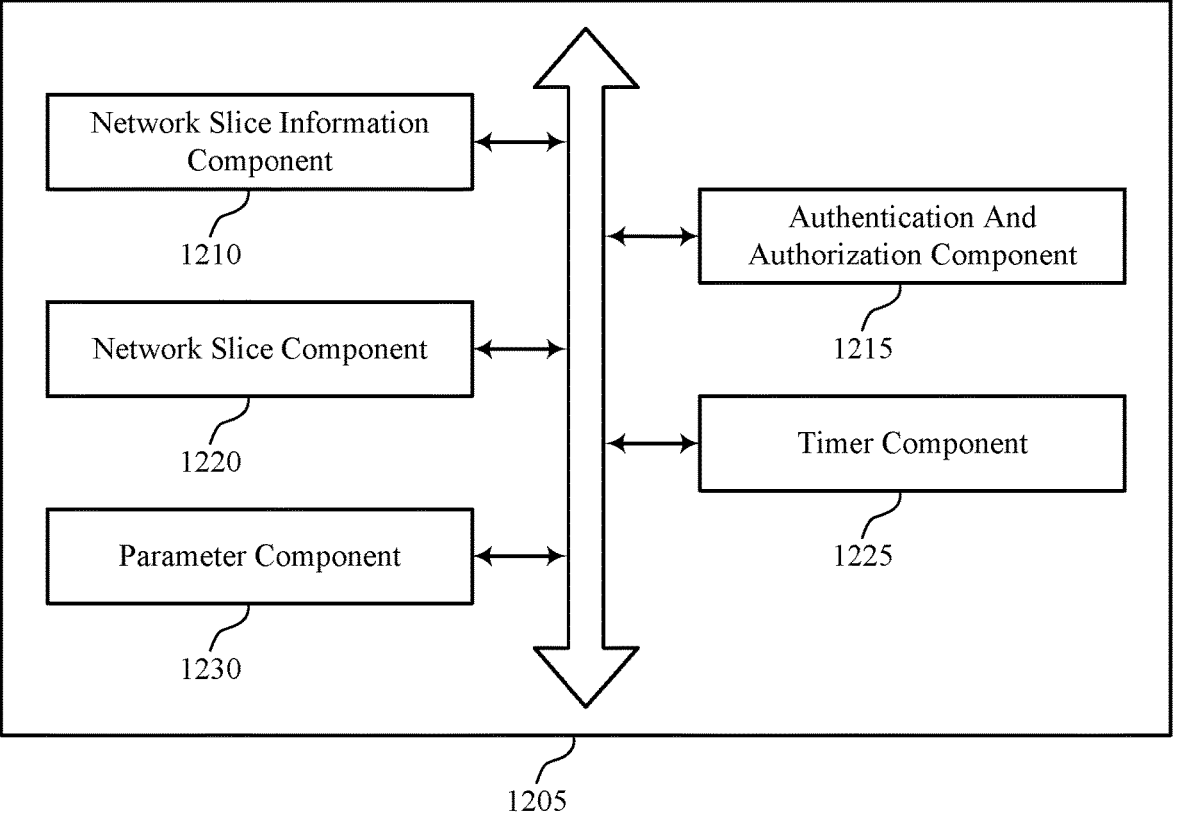
FIG. 12 shows a block diagram of a communications manager that supports NSSAA in accordance with one or more aspects of the present disclosure.

FIG. 12 shows a block diagram 1200 of a communications manager 1205 that supports NSSAA in accordance with one or more aspects of the present disclosure. The communications manager 1205 may be an example of aspects of a communications manager 1015, a communications manager 1115, or a communications manager 1310 described herein. The communications manager 1205 may include a network slice information component 1210, an authentication and authorization component 1215, a network slice component 1220, a timer component 1225, and a parameter component

1230. Each of these components may communicate, directly or indirectly, with one another (e.g., via one or more buses).

The network slice information component 1210 may receive a first indication related to an availability of an authentication credential associated with network slice information. In some examples, the network slice information component 1210 may determine that the network slice information is subject to NSSAA. The network slice information component 1210 may store the network slice information in a list of pending network slice information. The network slice information component 1210 may determine a subscription to network slice information by a UE. In some examples, the network slice information component 1210 may receive, from a UDM function, the first indication related to the availability of the authentication credential associated with the network slice information, the first indication indicating that the authentication credential associated with the network slice information is unavailable at the UE. The network slice information component 1210 may transmit, to the UDM function, a response message including provisioning information for the authentication credential associated with the network slice information.

The network slice information component 1210 may receive, from the UE, a first registration request message including the first indication related to the availability of the authentication credential associated with the network slice information, where the first registration request message further includes NSSAA capability information. In some cases, the first indication indicates that the authentication credential associated with the network slice information is available or unavailable at the UE. The network slice information component 1210 may transmit, to the UE, a registration response message associating the network slice information to a list of pending network slice information based on the received first registration request message.

In some examples, the network slice information component 1210 may receive, from the UE, a second indication related to the availability of the authentication credential associated with the network slice information. The second indication may indicate that the authentication credential associated with the network slice information is available at the UE. In some examples, the network slice information component 1210 may receive, from the UE, a second registration request message including the second indication related to the availability of the authentication credential associated with the network slice information, the second indication indicating that the authentication credential associated with the network slice information is available at the UE. The network slice information component 1210 may refrain from triggering an EAP for the network slice information based on that the network slice information is subject to NSSAA.

The authentication and authorization component 1215 may determine, based on the first indication, that the network slice information is subject to NSSAA. In some examples, the authentication and authorization component 1215 may provision the authentication credential associated with the network slice information for the UE based on the determining. In some examples, the authentication and authorization component 1215 may transmit, to an AMF, an indication related to the authentication credential associated with the network slice information, the indication indicating that the authentication credential associated with the network slice information is unavailable at the UE. In some examples, the authentication and authorization component 1215 may receive, from a UDM function, a request message to provision an authentication credential associated with network slice information for a UE based on the UE having a subscription to the network slice information and the network slice information being subject to NSSAA. In some examples, the authentication and authorization component 1215 may refrain from triggering an EAP for the network slice information based on that the network slice information is subject to NSSAA. The authentication and authorization component 1215 may provision the authentication credential associated with the network slice information for a control plane associated with the UE. In some examples, the authentication and authorization component 1215 may receive, from the AMF, a signaling message to trigger provisioning of the authentication credential associated with the network slice information for the UE.

The network slice component 1220 may transmit, to the UE, a non-access stratum mobility management request message including an EAP identifier based on that the network slice information is subject to NSSAA. In some examples, the network slice component 1220 may receive, from the UE, a non-access stratum mobility management response message including a second indication related to the availability of the authentication credential associated with the network slice information, the second indication indicating that the authentication credential associated with the network slice information is unavailable at the UE. In some examples, the network slice component 1220 may transmit, to a UDM function, a service request message to trigger the provisioning of the authentication credential associated with the network slice information for the UE, the service request message including a second indication indicating that the authentication credential associated with the network slice information is unavailable at the UE.

The timer component 1225 may enable a timer associated with the network slice information. In some examples, the timer component 1225 may transmit, to the UE, an EAP identifier associated with the network slice information based on the timer lapsing and the UE missing the authentication credential associated with the network slice information. The parameter component 1230 may perform a UE parameter update procedure to provision the authentication credential associated with the network slice information based on transmitting, to the AMF, the indication related to the authentication credential associated with the network slice information.

Figure 13:
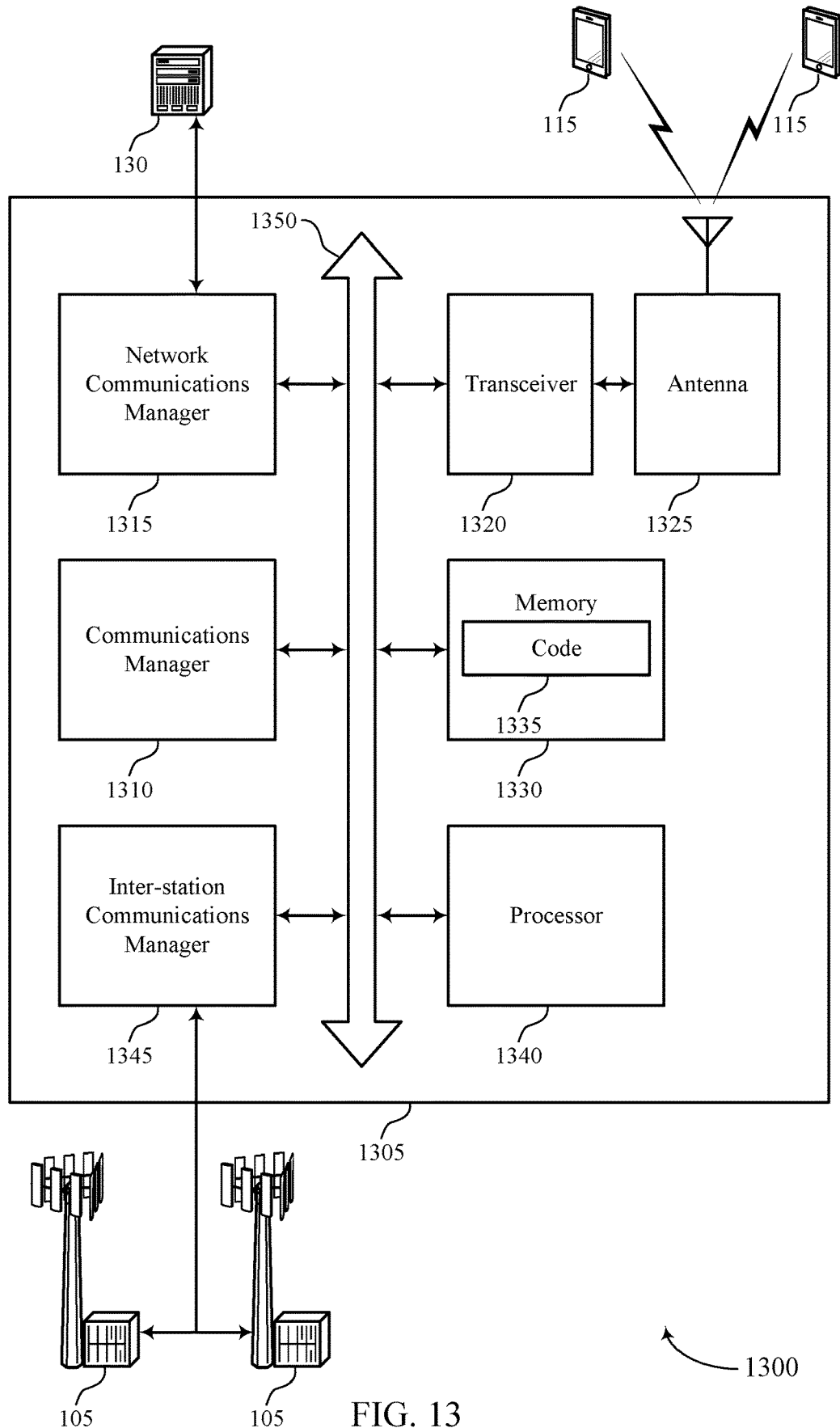
FIG. 13 shows a diagram of a system including a device that supports NSSAA in accordance with one or more aspects of the present disclosure.

FIG. 13 shows a diagram of a system 1300 including a device 1305 that supports NSSAA in accordance with one or more aspects of the present disclosure. The device 1305 may be an example of or include the components of device 1005, device 1105, a base station, a network function (e.g., an AMF, an AUSF, a NSSAAF, a UDM), or a server (e.g., a PS, an AAA) as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive a first indication related to an availability of an authentication credential associated with network slice information, determine, based on the first indication, that the network slice information is subject to NSSAA, and provision the authentication credential associated with the network slice information for a UE based on the determining. The communications manager 1310 may also determine a subscription to network slice information by a UE, determine that the network slice information is subject to NSSAA, and transmit, to an AMF, an indication related to the authentication credential associated with the network slice information, the indication indicating that the authentication credential associated with the network slice information is unavailable at the UE. The communications manager 1310 may also receive, from a UDM function, a request message to provision an authentication credential associated with network slice information for a UE based on the UE having a subscription to the network slice information and the network slice information being subject to NSSAA and transmit, to the UDM function, a response message including provisioning information for the authentication credential associated with the network slice information.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices. The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting NSSAA).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
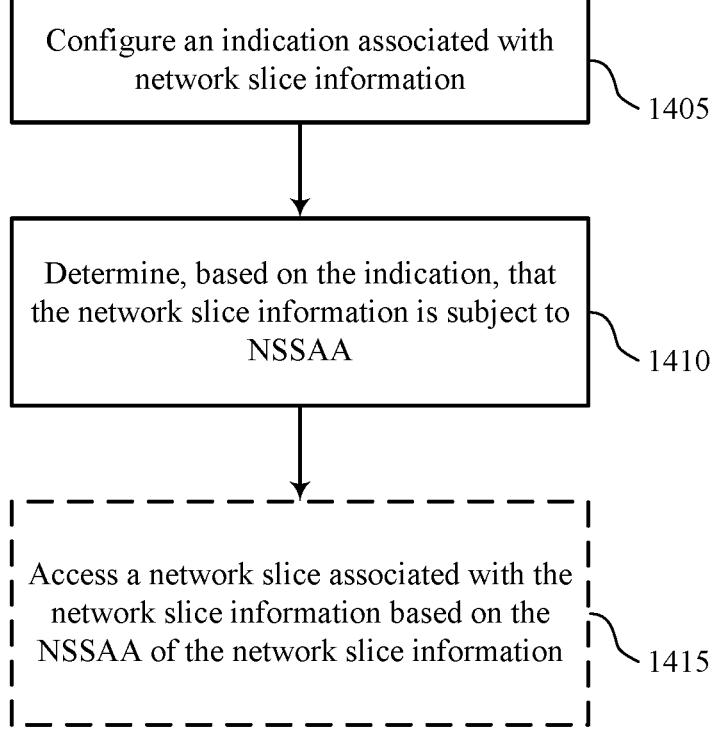

FIG. 14 shows a flowchart illustrating a method 1400 that supports NSSAA in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may configure an indication associated with network slice information. The operations of 1405 may be performed according to the methods described herein. In some examples, aspects of the operations of 1405 may be performed by a network slice information component as described with reference to FIGS. 6 through 9.

At 1410, the UE may determine, based on the indication, that the network slice information is subject to NSSAA. The operations of 1410 may be performed according to the methods described herein. In some examples, aspects of the operations of 1410 may be performed by an authentication and authorization component as described with reference to FIGS. 6 through 9.

At 1415, the UE may access a network slice associated with the network slice information based on the NSSAA of the network slice information. The operations of 1415 may be performed according to the methods described herein. In some examples, aspects of the operations of 1415 may be performed by a network slice component as described with reference to FIGS. 6 through 9.

FIG. 15 shows a flowchart illustrating a method 1500 that supports NSSAA in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may configure an indication associated with network slice information. The operations of 1505 may be performed according to the methods described herein. In some examples, aspects of the operations of 1505 may be performed by a network slice information component as described with reference to FIGS. 6 through 9.

At 1510, the UE may determine, based on the indication, that the network slice information is subject to NSSAA. The operations of 1510 may be performed according to the methods described herein. In some examples, aspects of the operations of 1510 may be performed by an authentication and authorization component as described with reference to FIGS. 6 through 9.

At 1515, the UE may receive, from a SPLMN, a second message including a second indication that the network slice information is subject to the NSSAA. The operations of 1515 may be performed according to the methods described herein. In some examples, aspects of the operations of 1515 may be performed by a network slice information component as described with reference to FIGS. 6 through 9.

At 1520, the UE may access a network slice associated with the network slice information based on the NSSAA of the network slice information. The operations of 1520 may be performed according to the methods described herein. In some examples, aspects of the operations of 1520 may be performed by a network slice component as described with reference to FIGS. 6 through 9.

Figure 16:
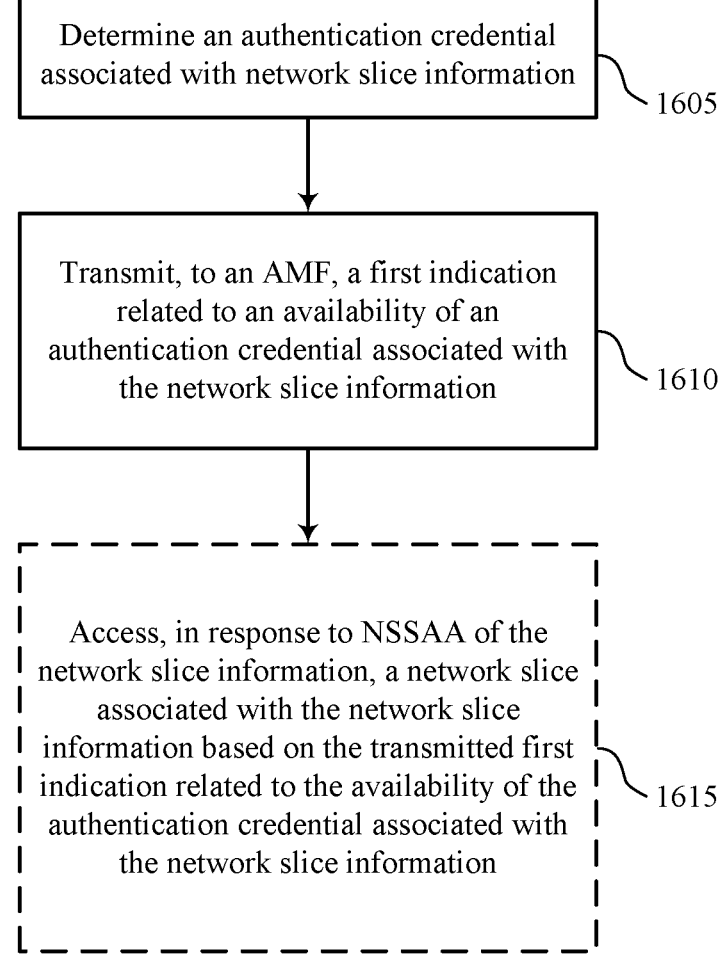

FIG. 16 shows a flowchart illustrating a method 1600 that supports NSSAA in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine an authentication credential associated with network slice information. The operations of 1605 may be performed according to the methods described herein. In some examples, aspects of the operations of 1605 may be performed by an authentication and authorization component as described with reference to FIGS. 6 through 9.

At 1610, the UE may transmit, to an AMF, a first indication related to an availability of an authentication credential associated with the network slice information. The operations of 1610 may be performed according to the methods described herein. In some examples, aspects of the operations of 1610 may be performed by a network slice information component as described with reference to FIGS. 6 through 9.

At 1615, the UE may access, in response to NSSAA of the network slice information, a network slice associated with the network slice information based on the transmitted first indication related to the availability of the authentication credential associated with the network slice information. The operations of 1615 may be performed according to the methods described herein. In some examples, aspects of the operations of 1615 may be performed by a network slice component as described with reference to FIGS. 6 through 9.

FIG. 17 shows a flowchart illustrating a method 1700 that supports NSSAA in accordance with one or more aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may determine an authentication credential associated with network slice information. The operations of 1705 may be performed according to the methods described herein. In some examples, aspects of the operations of 1705 may be performed by an authentication and authorization component as described with reference to FIGS. 6 through 9.

At 1710, the UE may receive, from an AMF, a non-access stratum mobility management request message including an EAP identifier request based on that the network slice information is subject to NSSAA. The operations of 1710 may be performed according to the methods described herein. In some examples, aspects of the operations of 1710 may be performed by an authentication and authorization component as described with reference to FIGS. 6 through 9.

At 1715, the UE may transmit, to the AMF, a non-access stratum mobility management response message including an indication related to the availability of the authentication credential associated with the network slice information, the indication indicating that the authentication credential associated with the network slice information is unavailable at the UE. The operations of 1715 may be performed according to the methods described herein. In some examples, aspects of the operations of 1715 may be performed by an authentication and authorization component as described with reference to FIGS. 6 through 9.

Figure 18:
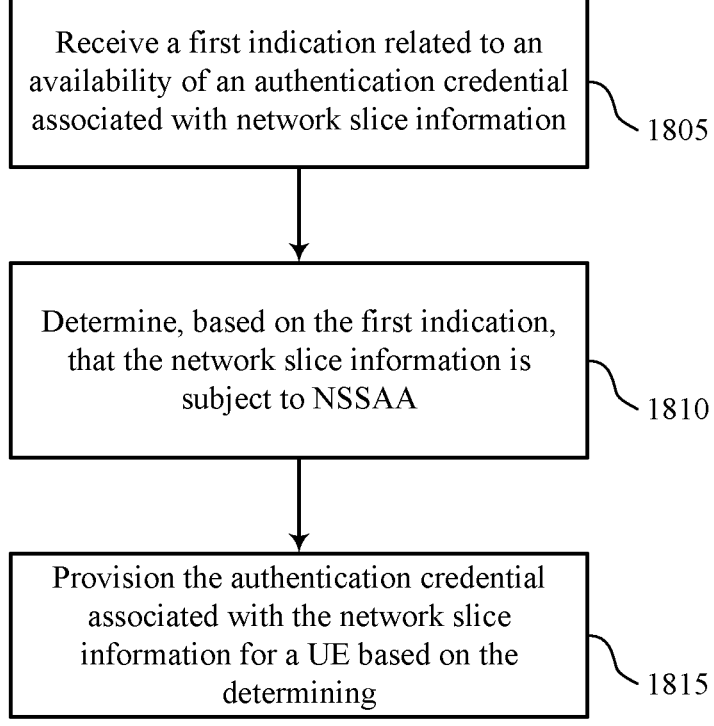

FIG. 18 shows a flowchart illustrating a method 1800 that supports NSSAA in accordance with one or more aspects of the present disclosure. The operations of method 1800 may be implemented by a base station 105, a network function (e.g., an AMF, an AUSF, a NSSAAF, a UDM), or a server (e.g., a PS, an AAA) as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station, the network function, or the server, may receive a first indication related to an availability of an authentication credential associated with network slice information. The operations of 1805 may be performed according to the methods described herein. In some examples, aspects of the operations of 1805 may be performed by a network slice information component as described with reference to FIGS. 10 through 13.

At 1810, the base station, the network function, or the server, may determine, based on the first indication, that the network slice information is subject to NSSAA. The operations of 1810 may be performed according to the methods described herein. In some examples, aspects of the operations of 1810 may be performed by an authentication and authorization component as described with reference to FIGS. 10 through 13.

At 1815, the base station, the network function, or the server, may provision the authentication credential associated with the network slice information for a UE based on the determining. The operations of 1815 may be performed according to the methods described herein. In some examples, aspects of the operations of 1815 may be performed by an authentication and authorization component as described with reference to FIGS. 10 through 13.

FIG. 19 shows a flowchart illustrating a method 1900 that supports NSSAA in accordance with one or more aspects of the present disclosure. The operations of method 1900 may be implemented by a base station 105, a network function (e.g., an AMF, an AUSF, a NSSAAF, a UDM), or a server (e.g., a PS, an AAA) as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station, the network function, or the server, may transmit, to a UE, a non-access stratum mobility management request message including an EAP identifier based on that network slice information is subject to NSSAA. The operations of 1905 may be performed according to the methods described herein. In some examples, aspects of the operations of 1905 may be performed by a network slice component as described with reference to FIGS. 10 through 13.

At 1910, the base station, the network function, or the server, may receive, from the UE, a non-access stratum mobility management response message including an indication related to an availability of an authentication credential associated with the network slice information, the indication indicating that the authentication credential associated with the network slice information is unavailable at the UE. The operations of 1910 may be performed according to the methods described herein. In some examples, aspects of the operations of 1910 may be performed by a network slice component as described with reference to FIGS. 10 through 13.

FIG. 20 shows a flowchart illustrating a method 2000 that supports NSSAA in accordance with one or more aspects of the present disclosure. The operations of method 2000 may be implemented by a base station 105, a network function (e.g., an AMF, an AUSF, a NSSAAF, a UDM), or a server (e.g., a PS, an AAA) as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station, the network function, or the server, may determine a subscription to network slice information by a UE. The operations of 2005 may be performed according to the methods described herein. In some examples, aspects of the operations of 2005 may be performed by a network slice information component as described with reference to FIGS. 10 through 13.

At 2010, the base station, the network function, or the server, may determine that the network slice information is subject to NSSAA. The operations of 2010 may be performed according to the methods described herein. In some examples, aspects of the operations of 2010 may be performed by a network slice information component as described with reference to FIGS. 10 through 13.

At 2015, the base station, the network function, or the server, may transmit, to an AMF, an indication related to the authentication credential associated with the network slice information, the indication indicating that the authentication credential associated with the network slice information is unavailable at the UE. The operations of 2015 may be performed according to the methods described herein. In some examples, aspects of the operations of 2015 may be performed by an authentication and authorization component as described with reference to FIGS. 10 through 13.

FIG. 21 shows a flowchart illustrating a method 2100 that supports NSSAA in accordance with one or more aspects of the present disclosure. The operations of method 2100 may be implemented by a base station 105, a network function (e.g., an AMF, an AUSF, a NSSAAF, a UDM), or a server (e.g., a PS, an AAA) as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station, the network function, or the server, may receive, from a UDM function, a request message to provision an authentication credential associated with network slice information for a UE based on the UE having a subscription to the network slice information and the network slice information being subject to NSSAA. The operations of 2105 may be performed according to the methods described herein. In some examples, aspects of the operations of 2105 may be performed by an authentication and authorization component as described with reference to FIGS. 10 through 13.

At 2110, the base station, the network function, or the server, may transmit, to the UDM function, a response message including provisioning information for the authentication credential associated with the network slice information. The operations of 2110 may be performed according to the methods described herein. In some examples, aspects of the operations of 2110 may be performed by a network slice information component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a UE, comprising: configuring an indication associated with network slice information; determining, based at least in part on the indication, that the network slice information is subject to NSSAA; and accessing a network slice associated with the network slice information based at least in part on the NSSAA of the network slice information.

Example 2: The method of example 1, further comprising: determining UE route selection policy, wherein determining that the network slice information is subject to the NSSAA is based at least in part on the UE route selection policy.

Example 3: The method of examples 2, wherein the UE route selection policy comprises the indication that the network slice information is subject to NSSAA.

Example 4: The method of any of examples 1 through 3, further comprising: receiving, from a single public land mobile network, a second message comprising a second indication that the network slice information is subject to the NSSAA.

Example 5: A method for wireless communication at a UE, comprising: determining an authentication credential associated with network slice information; transmitting, to an AMF, a first indication related to an availability of an authentication credential associated with the network slice information; and accessing, in response to NSSAA of the network slice information, a network slice associated with the network slice information based at least in part on the transmitted first indication related to the availability of the authentication credential associated with the network slice information.

Example 6: The method of example 5, wherein the first indication indicates that the authentication credential associated with the network slice information is available or unavailable at the UE.

Example 7: The method of any of examples 5 or 6, further comprising: transmitting, to the AMF, a first registration request message comprising the first indication related to the availability of the authentication credential associated with the network slice information, the first indication indicating that the authentication credential is unavailable at the UE, wherein the registration request message further comprises NSSAA capability information.

Example 8: The method of example 7, further comprising: receiving, from the AMF, a registration response message associating the network slice information to a list of pending network slice information.

Example 9: The method of example 7, further comprising: receiving, from a NSSAA function, the authentication credential associated with the network slice information in a user-plane associated with the UE based at least in part on the transmitted first indication indicating that the authentication credential is unavailable at the UE; and transmitting, to the AMF, a second registration request message comprising a second indication related to the availability of the authentication credential associated with the network slice information, the second indication indicating that the authentication credential is available at the UE.

Example 10: The method of example 7, further comprising: receiving, from a UDM function, the authentication credential associated with the network slice information in a control-plane associated with the UE based at least in part on transmitting, to the AMF, the first indication related to the availability of the authentication credential associated with the network slice information; and transmitting, to the AMF, a second registration request message comprising a second indication related to the availability of the authentication credential associated with the network slice information, the second indication indicating that the authentication credential is available at the UE.

Example 11: The method of any of examples 5 through 10, further comprising: receiving, from the AMF, a non-access stratum mobility management request message comprising an extensible authentication protocol identifier request based at least in part on that the network slice information is subject to NSSAA; and transmitting, to the AMF, a non-access stratum mobility management response message comprising a second indication related to the availability of the authentication credential associated with the network slice information, the second indication indicating that the authentication credential associated with the network slice information is unavailable at the UE.

Example 12: A method for wireless communication at an AMF, comprising: receiving a first indication related to an availability of an authentication credential associated with network slice information; determining, based at least in part on the first indication, that the network slice information is subject to NSSAA; and provisioning the authentication credential associated with the network slice information for a UE based at least in part on the determining.

Example 13: The method of example 12, wherein the first indication indicates that the authentication credential associated with the network slice information is available or unavailable at the UE.

Example 14: The method of any of examples 12 or 13, further comprising: receiving, from the UE, a first registration request message comprising the first indication related to the availability of the authentication credential associated with the network slice information, wherein the first registration request message further comprises NSSAA capability information.

Example 15: The method of example 14, further comprising: storing the network slice information in a list of pending network slice information.

Example 16: The method of example 14, further comprising: transmitting, to the UE, a registration response message associating the network slice information to a list of pending network slice information based at least in part on the received first registration request message.

Example 17: The method of example 14, further comprising: refraining from triggering an extensible authentication protocol for the network slice information based at least in part on that the network slice information is subject to NSSAA.

Example 18: The method of example 14, further comprising: receiving, from the UE, a second indication related to the availability of the authentication credential associated with the network slice information, the second indication indicating that the authentication credential associated with the network slice information is available at the UE.

Example 19: The method of example 18, further comprising: receiving, from the UE, a second registration request message comprising the second indication related to the availability of the authentication credential associated with the network slice information, the second indication indicating that the authentication credential associated with the network slice information is available at the UE.

Example 20: The method of any of examples 12 through 14, further comprising: transmitting, to the UE, a non-access stratum mobility management request message comprising an extensible authentication protocol identifier based at least in part on that the network slice information is subject to NSSAA; and receiving, from the UE, a non-access stratum mobility management response message comprising a second indication related to the availability of the authentication credential associated with the network slice information, the second indication indicating that the authentication credential associated with the network slice information is unavailable at the UE.

Example 21: The method of example 20, further comprising: transmitting, to a UDM function, a service request message to trigger the provisioning of the authentication credential associated with the network slice information for the UE, the service request message comprising a second indication indicating that the authentication credential associated with the network slice information is unavailable at the UE.

Example 22: The method of any of examples 14 through 21, further comprising: receiving, from a UDM function, the first indication related to the availability of the authentication credential associated with the network slice information, the first indication indicating that the authentication credential associated with the network slice information is unavailable at the UE; and refraining from triggering an extensible authentication protocol for the network slice information based at least in part on that the network slice information is subject to NSSAA.

Example 23: The method of example 22, further comprising: enabling a timer associated with the network slice information; and transmitting, to the UE, an extensible authentication protocol identifier associated with the network slice information based at least in part on the timer lapsing and the UE missing the authentication credential associated with the network slice information.

Example 24: A method for wireless communication at a UDM function, comprising: determining a subscription to network slice information by a UE; determining that the network slice information is subject to NSSAA; and transmitting, to an AMF, an indication related to the authentication credential associated with the network slice information, the indication indicating that the authentication credential associated with the network slice information is unavailable at the UE.

Example 25: The method of example 24, further comprising: performing a UE parameter update procedure to provision the authentication credential associated with the network slice information based at least in part on transmitting, to the AMF, the indication related to the authentication credential associated with the network slice information.

Example 26: The method of any of examples 24 or 25, further comprising: provisioning the authentication credential associated with the network slice information for a control plane associated with the UE.

Example 27: The method of any of example 24 through 26, further comprising: receiving, from the AMF, a signaling message to trigger provisioning of the authentication credential associated with the network slice information for the UE.

Example 28: A method for wireless communication at a, comprising: receiving, from a UDM function, a request message to provision an authentication credential associated with network slice information for a UE based at least in part on the UE having a subscription to the network slice information and the network slice information being subject to NSSAA; and transmitting, to the UDM function, a response message comprising provisioning information for the authentication credential associated with the network slice information.

Example 29: An apparatus for wireless communication comprising at least one means for performing a method of any one of examples 1 through 4.

Example 30: An apparatus for wireless communication comprising a processor and memory coupled to the processor, the processor and memory configured to perform a method of any one of examples 1 through 4.

Example 31: A non-transitory computer-readable medium storing code for wireless communication, the code comprising instructions executable by a processor to perform a method of any one of examples 1 through 4.

Example 32: An apparatus for wireless communication comprising at least one means for performing a method of any one of examples 5 through 11.

Example 33: An apparatus for wireless communication comprising a processor and memory coupled to the processor, the processor and memory configured to perform a method of any one of examples 5 through 11.

Example 34: A non-transitory computer-readable medium storing code for wireless communication, the code comprising instructions executable by a processor to perform a method of any one of examples 5 through 11.

Example 35: An apparatus for wireless communication comprising at least one means for performing a method of any one of examples 12 through 23.

Example 36: An apparatus for wireless communication comprising a processor and memory coupled to the processor, the processor and memory configured to perform a method of any one of examples 12 through 23.

Example 37: A non-transitory computer-readable medium storing code for wireless communication, the code comprising instructions executable by a processor to perform a method of any one of examples 12 through 23.

Example 38: An apparatus for wireless communication comprising at least one means for performing a method of any one of examples 24 through 27.

Example 39: An apparatus for wireless communication comprising a processor and memory coupled to the processor, the processor and memory configured to perform a method of any one of examples 24 through 27.

Example 40: A non-transitory computer-readable medium storing code for wireless communication, the code comprising instructions executable by a processor to perform a method of any one of examples 24 through 27.

Example 41: An apparatus for wireless communication comprising at least one means for performing a method of example 28.

Example 42: An apparatus for wireless communication comprising a processor and memory coupled to the processor, the processor and memory configured to perform a method of example 28.

Example 43: A non-transitory computer-readable medium storing code for wireless communication, the code comprising instructions executable by a processor to perform a method of example 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
a processor,
memory coupled with the processor, the processor and memory configured to:
configure an indication associated with network slice information;
determine, based at least in part on the indication and prior to a registration procedure associated with a network slice, that the network slice information is subject to network slice-specific authentication and authorization; and
access the network slice associated with the network slice information based at least in part on the network slice-specific authentication and authorization of the network slice information.

2. The apparatus of claim 1, wherein the processor and memory are further configured to:
determine a user equipment (UE) route selection policy, wherein the processor and memory are configured to determine that the network slice information is subject to the network slice-specific authentication and authorization is based at least in part on the UE route selection policy.

3. The apparatus of claim 2, wherein the UE route selection policy comprises the indication that the network slice information is subject to the network slice-specific authentication and authorization.

4. The apparatus of claim 1, wherein the processor and memory are further configured to:
receive, from a single public land mobile network, a second message comprising a second indication that the network slice information is subject to the network slice-specific authentication and authorization.

5. The apparatus of claim 1, further comprising:
at least one antenna or at least one antenna array.

6. An apparatus for wireless communication, comprising:
a processor,
memory coupled with the processor, the processor and memory configured to:
determine, prior to a registration procedure associated with a network slice, an authentication credential associated with network slice information;
transmit, to an access and mobility management function and prior to the registration procedure associated with the network slice, a first indication related to an availability of the authentication credential associated with the network slice information; and
access, in response to network slice-specific authentication and authorization of the network slice information, the network slice associated with the network slice information based at least in part on the transmitted first indication related to the availability of the authentication credential associated with the network slice information.

7. The apparatus of claim 6, wherein the first indication indicates that the authentication credential associated with the network slice information is available or unavailable at the apparatus.

8. The apparatus of claim 6, wherein the processor and memory are further configured to:
   transmit, to the access and mobility management function, a first registration request message comprising the first indication related to the availability of the authentication credential associated with the network slice information, the first indication indicating that the authentication credential is unavailable at the apparatus, wherein the first registration request message further comprises network slice-specific authentication and authorization capability information.

9. The apparatus of claim 8, wherein the processor and memory are further configured to:
   receive, from the access and mobility management function, a registration response message associating the network slice information to a list of pending network slice information.

10. The apparatus of claim 8, wherein the processor and memory are further configured to:
   receive, from a network slice-specific authentication and authorization function, the authentication credential associated with the network slice information in a user-plane associated with the apparatus based at least in part on the first indication indicating that the authentication credential is unavailable at the apparatus; and
   transmit, to the access and mobility management function, a second registration request message comprising a second indication related to the availability of the authentication credential associated with the network slice information, the second indication indicating that the authentication credential is available at the apparatus.

11. The apparatus of claim 8, wherein the processor and memory are further configured to:
   receive, from a user data management function, the authentication credential associated with the network slice information in a control-plane associated with the apparatus based at least in part on transmitting, to the access and mobility management function, the first indication related to the availability of the authentication credential associated with the network slice information; and
   transmit, to the access and mobility management function, a second registration request message comprising a second indication related to the availability of the authentication credential associated with the network slice information, the second indication indicating that the authentication credential is available at the apparatus.

12. The apparatus of claim 6, wherein the processor and memory are further configured to:
   receive, from the access and mobility management function, a non-access stratum mobility management request message comprising an extensible authentication protocol identifier request based at least in part on the network slice information being subject to the network slice-specific authentication and authorization; and transmit, to the access and mobility management function, a non-access stratum mobility management response message comprising a second indication related to the availability of the authentication credential associated with the network slice information, the second indication indicating that the authentication credential associated with the network slice information is unavailable at the apparatus.

13. The apparatus of claim 6, further comprising:
   at least one antenna or at least one antenna array.

14. An apparatus for wireless communication, comprising:
   a processor,
   memory coupled with the processor, the processor and memory configured to:
      receive, from a user equipment (UE), a first indication related to an availability of an authentication credential associated with network slice information;
      determine, based at least in part on the first indication, that the network slice information is subject to network slice-specific authentication and authorization; and
      provision the authentication credential associated with the network slice information for the UE based at least in part on the determining.

15. The apparatus of claim 14, wherein the first indication indicates that the authentication credential associated with the network slice information is available or unavailable at the UE.

16. The apparatus of claim 14, wherein the processor and memory are further configured to:
   receive, from the UE, a first registration request message comprising the first indication related to the availability of the authentication credential associated with the network slice information, wherein the first registration request message further comprises network slice-specific authentication and authorization capability information.

17. The apparatus of claim 16, wherein the processor and memory are further configured to:
   store the network slice information in a list of pending network slice information.

18. The apparatus of claim 16, wherein the processor and memory are further configured to:
   transmit, to the UE, a registration response message associating the network slice information to a list of pending network slice information based at least in part on the received first registration request message.

19. The apparatus of claim 16, wherein the processor and memory are further configured to:
   refrain from triggering an extensible authentication protocol for the network slice information based at least in part on the network slice information being subject to the network slice-specific authentication and authorization.

20. The apparatus of claim 16, wherein the processor and memory are further configured to:
   receive, from the UE, a second indication related to the availability of the authentication credential associated with the network slice information, the second indication indicating that the authentication credential associated with the network slice information is available at the UE.

21. The apparatus of claim 20, wherein the processor and memory are further configured to:
   receive, from the UE, a second registration request message comprising the second indication related to the availability of the authentication credential associated with the network slice information, the second indication indicating that the authentication credential associated with the network slice information is available at the UE.

22. The apparatus of claim 16, wherein the processor and memory are further configured to:

transmit, to the UE, a non-access stratum mobility management request message comprising an extensible authentication protocol identifier based at least in part on the network slice information being subject to the network slice-specific authentication and authorization; and receive, from the UE, a non-access stratum mobility management response message comprising a second indication related to the availability of the authentication credential associated with the network slice information, the second indication indicating that the authentication credential associated with the network slice information is unavailable at the UE.

23. The apparatus of claim 22, wherein the processor and memory are further configured to:

transmit, to a user data management function, a service request message to trigger the provisioning of the authentication credential associated with the network slice information for the UE, the service request message comprising the second indication indicating that the authentication credential associated with the network slice information is unavailable at the UE.

24. The apparatus of claim 16, wherein the processor and memory are further configured to:

receive, from a user data management function, the first indication related to the availability of the authentication credential associated with the network slice information, the first indication indicating that the authentication credential associated with the network slice information is unavailable at the UE; and refrain from triggering an extensible authentication protocol for the network slice information based at least in part on the network slice information being subject to the network slice-specific authentication and authorization.

25. The apparatus of claim 24, wherein the processor and memory are further configured to:

enable a timer associated with the network slice information; and transmit, to the UE, an extensible authentication protocol identifier associated with the network slice information based at least in part on the timer lapsing and the UE missing the authentication credential associated with the network slice information.

26. The apparatus of claim 14, further comprising:

at least one antenna or at least one antenna array.

27. An apparatus for wireless communication, comprising:

a processor, memory coupled with the processor, the processor and memory configured to:

determine, at a user data management function, a subscription to network slice information by a user equipment (UE);

determine, at the user data management function, that the network slice information is subject to network slice-specific authentication and authorization; and transmit, from the user data management function to an access and mobility management function, an indication related to an authentication credential associated with the network slice information, the indication indicating that the authentication credential associated with the network slice information is unavailable at the UE.

28. The apparatus of claim 27, wherein the processor and memory are further configured to:

perform a UE parameter update procedure to provision the authentication credential associated with the network slice information based at least in part on transmitting, to the access and mobility management function, the indication related to the authentication credential associated with the network slice information.

29. The apparatus of claim 27, wherein the processor and memory are further configured to:

provision the authentication credential associated with the network slice information for a control plane associated with the UE.

30. The apparatus of claim 27, wherein the processor and memory are further configured to:

receive, from the access and mobility management function, a signaling message to trigger provisioning of the authentication credential associated with the network slice information for the UE.

* * * * *